(12) United States Patent
Guillet et al.

(10) Patent No.: US 9,167,538 B2
(45) Date of Patent: Oct. 20, 2015

(54) METHOD FOR ADJUSTING THE TRANSMISSION POWER OF THE SIGNALS TRANSFERRED BY AT LEAST ONE HOME BASE STATION

(75) Inventors: Julien Guillet, Rennes (FR); Loic Brunel, Rennes (FR); Nicolas Gresset, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

(21) Appl. No.: 13/824,659

(22) PCT Filed: Oct. 28, 2011

(86) PCT No.: PCT/EP2011/068942
§ 371 (c)(1),
(2), (4) Date: Apr. 30, 2013

(87) PCT Pub. No.: WO2012/065827
PCT Pub. Date: May 24, 2012

(65) Prior Publication Data
US 2013/0231153 A1  Sep. 5, 2013

(30) Foreign Application Priority Data
Nov. 19, 2010  (EP) .................................... 10191903

(51) Int. Cl.
*H04W 52/24* (2009.01)
*H04W 52/34* (2009.01)
(Continued)

(52) U.S. Cl.
CPC .......... *H04W 52/243* (2013.01); *H04W 52/244* (2013.01); *H04W 52/343* (2013.01); *H04W 52/143* (2013.01); *H04W 52/225* (2013.01); *H04W 52/283* (2013.01)

(58) Field of Classification Search
CPC ... H04W 52/143; H04W 52/04; H04W 52/24; H04W 52/243; H04W 52/244; H04W 52/245; H04W 52/246; H04W 52/247; H04W 52/248; H04W 52/26; H04W 52/283; H04W 52/225; H04W 52/343

USPC ......... 455/69, 522, 13.1, 63.1, 501, 450, 436, 455/67.13, 509, 67.11, 220, 115.1; 375/260; 370/329
See application file for complete search history.

(56) References Cited

U.S. PATENT DOCUMENTS 6,778,812 B1 * 8/2004 Zhang ......................... 455/67.13
2007/0042799 A1 * 2/2007 Jubin et al. .................... 455/522
(Continued)

FOREIGN PATENT DOCUMENTS

WO  2010 034358  4/2010

OTHER PUBLICATIONS

International Search Report Issued Jan. 19, 2012 in PCT/EP11/68942 Filed Oct. 28, 2011.

*Primary Examiner* — Tan Trinh
(74) *Attorney, Agent, or Firm* — Oblon, McClelland, Maier & Neustadt, L.L.P.

(57) ABSTRACT

A method and apparatus for adjusting the transmission power of signals transferred by at least one home base station through a wireless interface to a mobile device, the at least one home base station being located in the cell of a base station. The transmission power is adjusted by first performing an inter cell interference coordination procedure including determining at least one high interference reference zone for the at least one home base station. Then the signal transmission power adjustment for the at least one home base station is determined to ensure a given outage probability that a given function g representing the mobile terminal performance degradation is lower than or equal to a threshold value in the high interference reference zone around the at least one home base station.

15 Claims, 6 Drawing Sheets

(51) Int. Cl.
*H04W 52/14* (2009.01)
*H04W 52/22* (2009.01)
*H04W 52/28* (2009.01)

(56) References Cited

U.S. PATENT DOCUMENTS

| | | | |
|---|---|---|---|
| 2007/0270151 A1* | 11/2007 | Claussen et al. | 455/444 |
| 2008/0219364 A1* | 9/2008 | Hui et al. | 375/260 |
| 2009/0042593 A1* | 2/2009 | Yavuz et al. | 455/522 |
| 2009/0042594 A1 | 2/2009 | Yavuz et al. | |
| 2009/0042595 A1 | 2/2009 | Yavuz et al. | |
| 2009/0042596 A1* | 2/2009 | Yavuz et al. | 455/522 |
| 2009/0238289 A1* | 9/2009 | Sampath et al. | 375/260 |
| 2010/0048212 A1* | 2/2010 | Yavuz et al. | 455/436 |
| 2010/0099449 A1* | 4/2010 | Borran et al. | 455/501 |
| 2010/0195619 A1* | 8/2010 | Bonneville et al. | 370/331 |
| 2010/0197338 A1* | 8/2010 | Bonneville et al. | 455/522 |
| 2010/0296422 A1* | 11/2010 | Ericson et al. | 370/310 |
| 2011/0003557 A1* | 1/2011 | Morita et al. | 455/67.11 |
| 2011/0003561 A1* | 1/2011 | Miao et al. | 455/69 |
| 2011/0105135 A1* | 5/2011 | Krishnamurthy et al. | 455/450 |
| 2011/0201377 A1* | 8/2011 | Kazmi | 455/522 |
| 2011/0250881 A1 | 10/2011 | Michel et al. | |
| 2011/0319025 A1* | 12/2011 | Siomina et al. | 455/63.1 |

* cited by examiner

METHOD FOR ADJUSTING THE TRANSMISSION POWER OF THE SIGNALS TRANSFERRED BY AT LEAST ONE HOME BASE STATION

CROSS-REFERENCE TO RELATED APPLICATIONS

This application is a national stage of PCT International Application No. PCT/EP11/68942 filed on Oct. 28, 2011, which claims the benefit of priority from a prior EP Application No. 10191903.3 filed on Nov. 19, 2010. The entire contents of the PCT international application and the EP application are incorporated herein by reference.

The present invention relates generally to a method and a device for adjusting the transmission power of the signals transferred by a base station through a wireless interface.

Wireless cellular telecommunication networks are largely deployed but there are still some areas not covered by the base stations of the wireless cellular telecommunication network. The base stations are deployed by an operator according to a given planning.

For example, the access to the wireless cellular telecommunication network might not be possible or might require a too high transmission power or a too low spectral efficiency, i.e., too many system resources for a mobile terminal located in a building, if the signals radiated by the base stations and/or by the mobile terminal are too attenuated.

Solutions are proposed today. Particular base stations which are not necessarily deployed by operator and thus not following a given planning, like home base stations or femto base stations or pico base stations or relays, may provide coverage areas within the buildings and base station offload. Relays may also provide outdoor coverage extension.

The home base stations or femto base stations provide a limited coverage area. Due to the constant coverage area size reduction and spectral efficiency increase, inter-cell interference has become a main issue. Inter-cell interference coordination (ICIC) techniques intend to mitigate the inter-cell interference problem. Classically, a mobile terminal reports to the base station the mobile terminal is currently served by, the interference it receives from neighbouring base stations and/or home base stations. Base stations exchange also messages between each other in order to allow an efficient ICIC. However, the base station to base station messages need establishment of links between the base stations. The same links between base stations and home base stations or between home base stations cannot be established in some cases.

A massive deployment of home base stations prevents from having such links between a base station and all the home base stations located within the coverage area of the base station. Even if the links exist, the amount of messages on these links must be as low as possible in order not to put an excessive burden on the core network. These home base stations may strongly interfere with the base station and even create coverage holes.

Without shadowing, the interference impact depends on the distance separating the base station and the home base station. In the downlink channel, the higher the distance between base station and home base station is, the larger the area in which the mobile terminals served by the base station and located in the vicinity of the home base station are strongly interfered is.

With shadowing, the interference impact is not only related to the distance between the home base station and the base station. In downlink channel, the interference also depends on the shadowing between each mobile terminal close to the home base station and the base station. Thus, the path gain between the home base station and the base station or the received power from the base station at the home base station is even more relevant.

The home base stations may enable a limited number of mobile terminals to access the wireless cellular telecommunication network through their respective resources. The mobile terminals allowed to access the resources of the network through the home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and its family can access the wireless cellular telecommunication network through the home base station. These mobile terminals are associated with the home base station.

Base stations enable a large number of mobile terminals to access the wireless cellular telecommunication network through their respective resources. The mobile terminals allowed to access the resources of the network through the base station may be determined by the operator of the wireless cellular telecommunication network.

The cell of a base station is usually much larger than a cell of a home base station.

Inter-cell interference coordination (ICIC) techniques have been extensively discussed between base stations.

The present invention aims at avoiding that signals transferred between home base stations and mobile terminals served by the home base stations interfere on signals transferred between base stations and mobile terminals served by the base stations.

To that end, the present invention concerns a method for adjusting the transmission power of the signals transferred by at least one home base station through a wireless interface, the at least one home base station being located in the cell of a base station, characterised in that the method comprises the steps of:

determining at least one high interference reference zone for the at least one home base station, the high interference reference zone being a zone in which signals transferred by the base station and the at least one home base station interfere and on which interferences are controlled, determining the signal transmission power for the at least one home base station, the signal transmission power $P_{t,HBS}$, transmitted by the at least one home base station, being set in order to ensure a given outage probability $P_{out}$ that a given function g representing the mobile terminal performance degradation is lower than or equal to a threshold RT in the high interference reference zone around the at least one home base station.

The present invention concerns also a device for adjusting the transmission power of the signals transferred by at least one home base station through a wireless interface, the at least one home base station being located in the cell of a base station, characterised in that the device comprises:

means for determining at least one high interference reference zone for the at least one home base station, the high interference reference zone being a zone in which signals transferred by the base station and the at least one home base station interfere and on which interferences are controlled, means for determining the signal transmission power for the at least one home base station, the signal transmission power $P_{t,HBS}$, transmitted by the at least one home base station, being set in order to ensure a given outage probability $P_{out}$ that a given function g representing the mobile terminal performance degradation is lower than or equal to a threshold RT in the high interference reference zone around the at least one home base station.

Thus, the level of degradation in at least one area around at least one home base station is controlled. For instance, the degradation close to the home base station, inside a building or in a small zone around the building, is overlooked. Furthermore, the outage probability approach is well suited for the random behaviour of received powers.

According to a particular feature, the function g representing the mobile terminal performance degradation is defined according to a ratio of the base station interference level form neighbouring base stations and the received power from the at least one home base station or a ratio of base station signal to interference plus noise ratio with the interference from the at least one home base station and base station signal to interference plus noise ratio without the interference from the at least one home base station or a ratio of Shannon capacity from base station with the interference from the at least one home base station and Shannon capacity from base station without the interference from the at least one home base station or a ratio of modelled spectral efficiency from base station with the interference from the at least one home base station and modelled spectral efficiency from base station without the interference from the at least one home base station or the ratio of empirical spectral efficiency from base station with the interference from the at least one home base station and empirical spectral efficiency from base station without the interference from the at least one home base station.

Thus, the function g is representing the mobile terminal performance degradation in a realistic way, ensuring efficient inter-cell interference coordination.

The present invention is effective when modelled spectral efficiency are used, i.e. when spectral efficiency is derived from a formula or when empirical techniques are used like for example a use of at least one look-up table.

According to a particular feature, plural home base stations are comprised in the cell of the base station and the same signal transmission power is used by each home base station comprised in the cell of the base station.

Thus, the transmit power computation is common to all home base stations. The computation cost is reduced. Furthermore, the transmit power can be easily broadcasted to all home base stations by the base station and this common transmit power remains valid for a longer time.

According to a particular feature, plural home base stations are comprised in the cell of the base station and the home base stations comprised in at least one subset of home base stations comprised in the cell of the base station use the same signal transmission power and the signal transmission power used by at least one home base station which does not belong to one subset of home base stations is different from the signal transmission power used by the home base stations comprised in said one subset of home base stations.

Thus, the transmit power computation is common to all home base stations of the subset of home base stations. The computation cost is reduced. Furthermore, the transmit power can be easily broadcasted to all home base stations of the subset of home base stations for example by the base station and this common transmit power remains valid for a longer time.

That is particularly interesting when the subset of home base stations comprises all the home base stations which are located in a same building or in a same predetermined area of a building.

According to a particular feature, plural home base stations are comprised in the cell of the base station and the signal transmission power used by each home base station is peculiar to each home base station comprised in the cell of the base station.

Thus, the transmit power of a home base station is well adapted to its situation.

According to a particular feature, plural home base stations are comprised in the cell of the base station and in that the signal transmission power used by each home base station comprised in the cell of the base station is decomposed into a common value for the home base stations comprised in the cell of the base station and an adjustment value peculiar to each home base station comprised in the cell of the base station.

Thus, the transmit power of a home base station is well adapted to its situation while also taking into account the situation of other base stations in order to control the global degradation in the cell of the base station.

According to a particular feature, the transmit power is further determined so as to have the same high interference reference zone size, the same outage probability $P_{out}$, the same threshold RT and the same function g for each home base station comprised in the cell of the base station.

Thus, the same degradation of the base station performance is allowed for each home base station introduced in the base station coverage area. A same "cost" is associated to the deployment of each new home base station.

As the same degradation of the base station performance is allowed for each home base station, the present invention provides a high interference reference zone equalisation method.

According to a particular feature, the function g depends on the useful power $P_{U, BS-MT}$ received by a mobile terminal located in the high interference reference zone from the base station and/or depends on the interfering power $P_{I, BS-MT}$ received by the mobile terminal from at least one neighbouring base station plus Additive White Gaussian Noise and/or depends on the power $P_{I,HBS-MT}$ which is received by the mobile terminal from the home base station or on one path gain or on a combination of the path gains $P_{G,HBS-MT}$ between the at least one home base station and the mobile terminal and the signal power which is radiated by said at least one home base station.

Thus, the whole environment of mobile terminals around the home base station is taken into account, guaranteeing efficient home base station power setting.

According to a particular feature, the useful power $P_{U, BS-MT}$ received by at least one mobile terminal from the base station, and/or the interfering power $P_{I, BS-MT}$ from at least one neighbouring base station plus Additive White Gaussian Noise and/or the power $P_{I,HBS-M}$ received by the mobile terminal from the at least one home base station or one path gain or the combination of the path gains $P_{G,HBS-MT}$ between the at least one home base station and the mobile terminal are obtained by measurements.

Thus, a better precision of the home base station power setting is achieved since the true environment of the mobile terminal is reported by the mobile terminal itself.

It has to be noted here that measurements may be accumulated on long periods for mobile terminals which have previously moved though the cell of the base station.

According to a particular feature, the useful power $P_{U,BS-MT}$ received by the mobile terminal from the base station, and/or the interfering power $P_{I, BS-MT}$ from at least one neighbouring base station plus Additive White Gaussian Noise and/or the power $P_{I,HBS-MT}$ received by the mobile terminal from the at least one home base station or one path gain or the combination of the path gains $P_{G,HBS-MT}$ between the at least one home base station and the mobile terminal are obtained from a given model.

Thus, no measurements are needed for the variable which a model is used for.

According to a particular feature, the useful power $P_{U, BS-MT}$ received by the mobile terminal from the base station, and/or the interfering power $P_{I, BS-MT}$ from at least one neighbouring base station plus Additive White Gaussian Noise and/or the power $P_{I,HBS-MT}$ received by the mobile terminal from the home base station or one path gain or the combination of the path gains $P_{G,HBS-MT}$ between the at least one home base station and the mobile terminal are obtained from samples generated from a method based on a given model.

Thus, no measurements are needed for the variable which a model is used for. Furthermore, the sample generation approach guarantees a more accurate computation, taking into more accurate but also more complicated models, like models involving correlated random variables.

According to a particular feature, the signal transmission power for the at least one home base station is determined according to information representative of the location of at least one mobile terminal.

Thus, the power and/or path gain measurements are not necessary. In this case, a path-gain model and/or data-base (e.g., a map). Even with the home base station location information, path gain information in the high interference reference zone can be obtained from a data-base.

According to a particular feature, the signal transmission power for the at least one home base station is determined from a quantile at a given probability value $P_{out}$ of a function u of random variables, the quantile being the value of u such that the probability that u is lower than $u_Q$ is equal to $P_{out}$.

Thus, the random behaviour of involved variables is well taken into account in the signal transmission computation.

According to a particular feature, the quantile is obtained using a random model, numerical values or a combination of both.

Thus, the quantile is efficiently obtained depending on the knowledge on random variables, i.e., on whether they are distributed according to a known model or they are obtained from measurements or a combination of both.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 4:
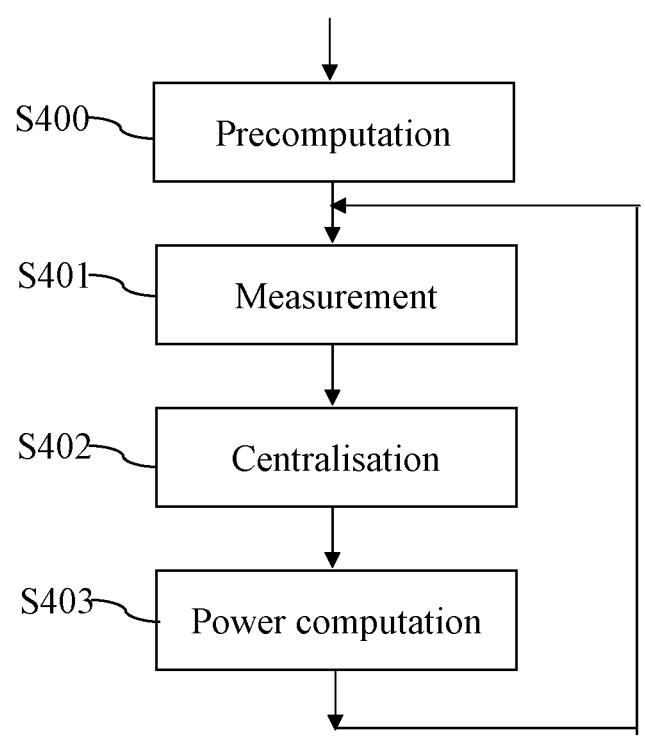
Figure 5:
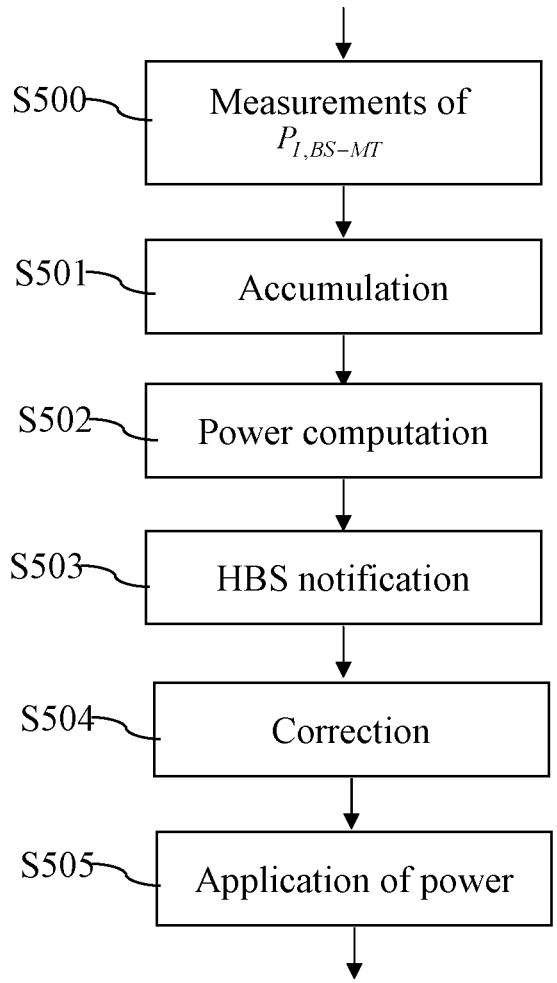
Figure 6:
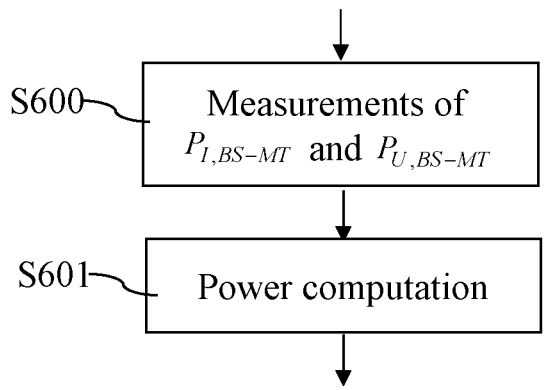
Figure 7:
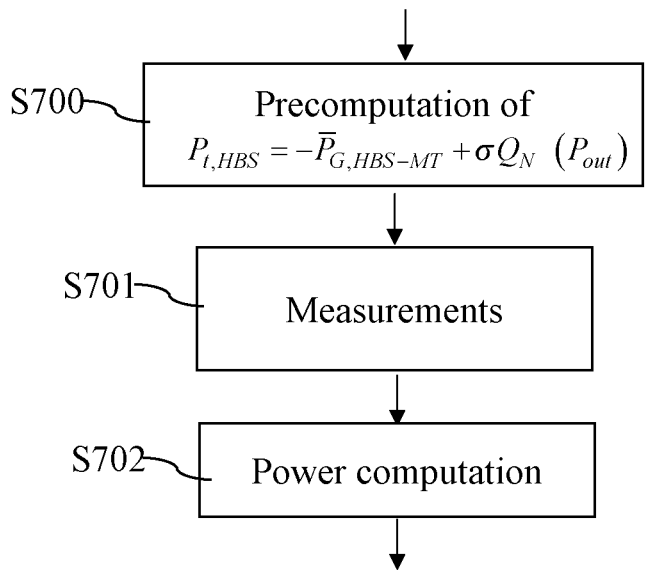
Figure 8:
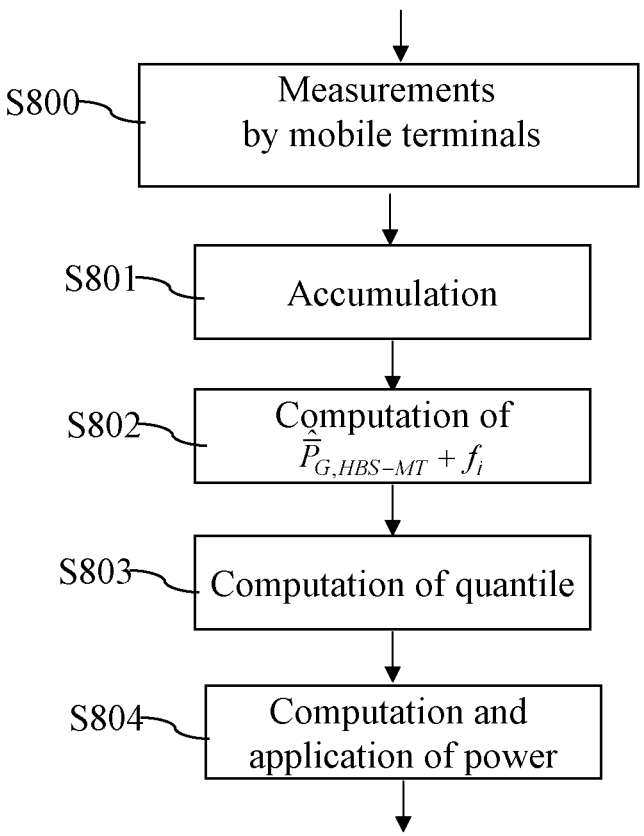
Figure 9:
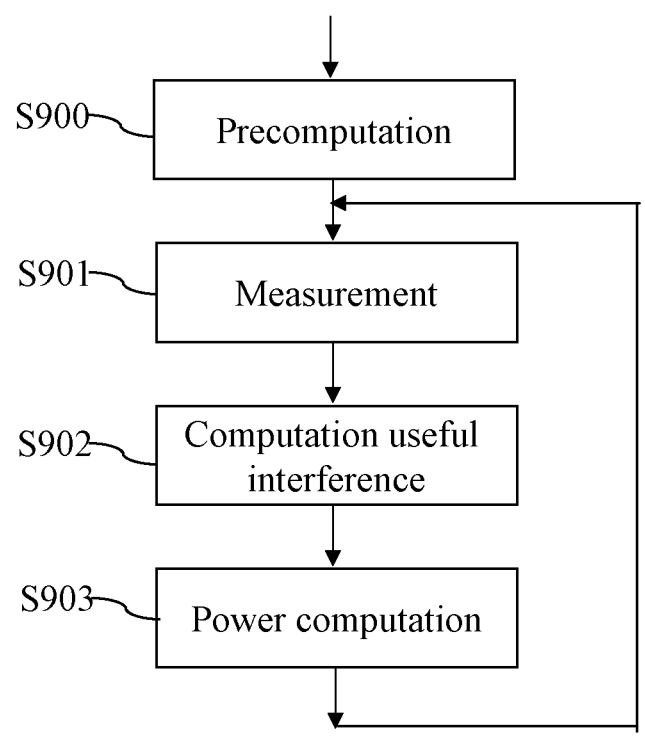

FIG. 4 discloses a general algorithm according to the present invention;

FIG. 5 discloses a first example of inter cell interference coordination algorithm according to the present invention;

FIG. 6 discloses a second example of inter cell interference coordination algorithm according to the present invention;

FIG. 7 discloses a third example of inter cell interference coordination algorithm according to the present invention;

FIG. 8 discloses a fourth example of inter cell interference coordination algorithm according to the present invention;

FIG. 9 discloses a fifth example of inter cell interference coordination algorithm according to the present invention.

Figure 1:
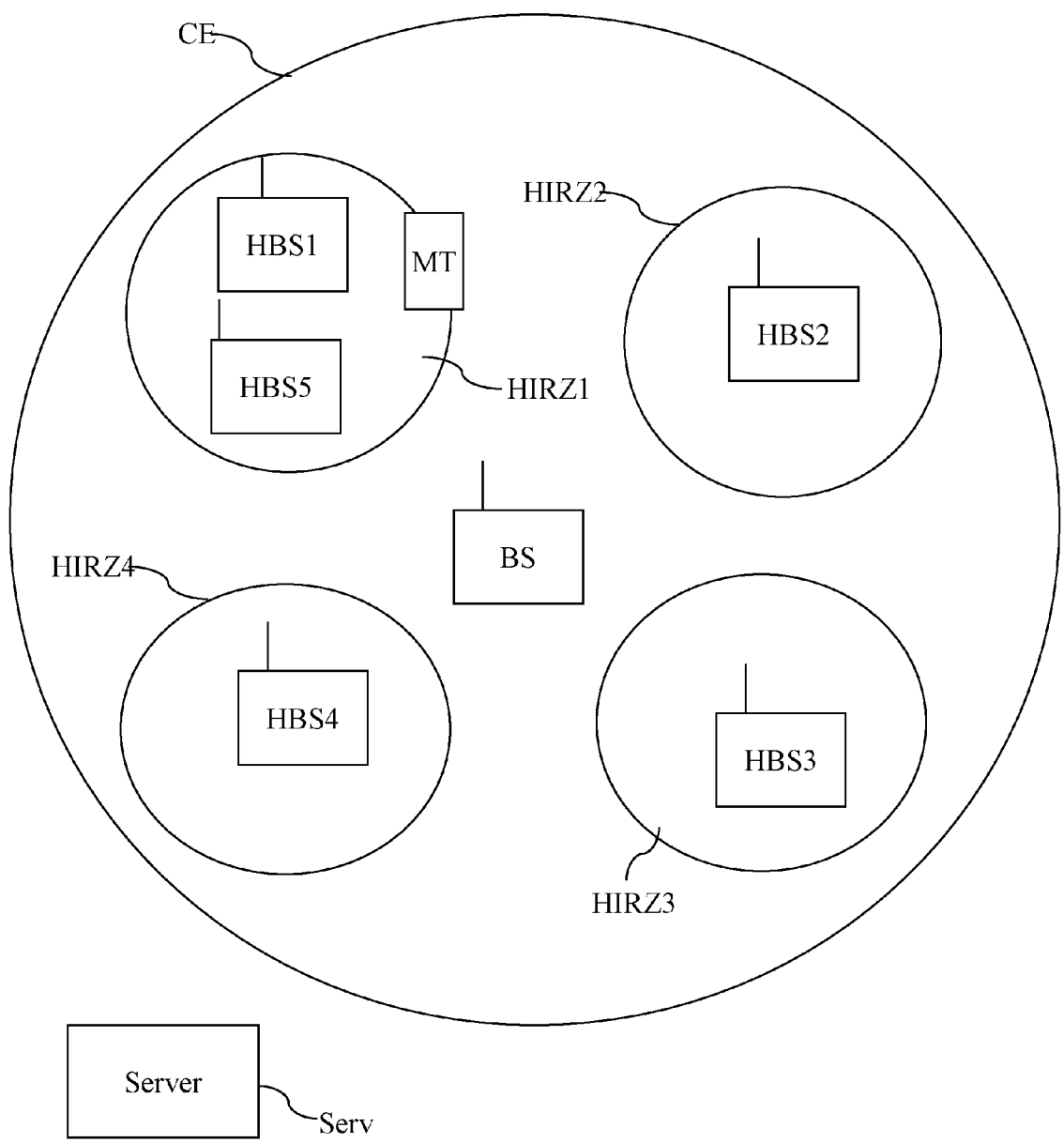
FIG. 1 represents a wireless cellular telecommunication network in which the present invention is implemented.

FIG. 1 represents a wireless cellular telecommunication network in which the present invention is implemented.

In FIG. 1, one base station BS and plural home base stations HBS1 to HBS5 of a wireless cellular telecommunication network are shown.

Only one base station BS and five home base stations HBS1 to HBS5 are shown but we can understand that the present invention works when a more important number of base stations BS and/or home base stations HBS exist.

The base station BS is for example a base station of a wireless cellular telecommunication network which serves mobile terminals located in the cell CE of the base station BS.

Only one mobile terminal MT is shown in FIG. 1 for the sake of clarity.

The home base stations HBS1 to HBS5 are named also femto base stations or pico base stations or relays. For example, a relay is a home base station HBS which is connected to the wireless cellular telecommunication network via a wireless link with the base station BS.

Each home base station HBS1 to HBS5 is for example located into home and may enable mobile terminals MT associated to the home base station HBS to access the wireless cellular telecommunication network.

For example, the home base stations HBS1 and HBS5 are located in the same building.

For example, a home base station HBS and a mobile terminal MT are associated when the home base station HBS belongs to the owner of the mobile terminal MT or when the home base station HBS belongs to the family or friends of the owner of the mobile terminal MT.

When a mobile terminal MT is served by a base station BS or a home base station HBS, it can receive or establish or continue a communication with a remote telecommunication device through the base station BS or the home base station HBS.

The base station BS is able to receive signals transferred by mobile terminals MT which are located in the area CE. The base station BS transfers signals which can be received and processed by mobile terminals MT located in the cell CE. In the example of FIG. 1, the base station BS has only one cell CE. The present invention is also applicable when the base station BS has plural cells. In that case, the present invention is applied independently for each cell of the base station BS.

The home base stations HBS are comprised in the cell CE of the base station BS.

The home base stations HBS radiate signals which can be received and processed by mobile terminals.

As the home base stations HBS are located in the cell CE, the level of degradation is characterised here by a high-interference reference zone (HIRZ), which is a zone where mobile terminals performances in downlink are degraded beyond a certain threshold.

The high interference reference zone HIRZ1 is a zone around the home base station HBS1 where mobile terminals performances in downlink are degraded beyond a certain threshold as both base station BS and home base station HBS1 radiate signals in that zone.

As the home bass station HBS5 is located in the same building as the one the home base station HBS1 is located in, the high interference reference zone HIRZ1 is also a zone around the home base station HBS5 where mobile terminals performances in downlink are degraded beyond a certain threshold as both base station BS and home base station HBS5 radiate signals in that zone.

The high interference reference zone HIRZ2 is a zone around the home base station HBS2 where mobile terminals performances in downlink are degraded beyond a certain threshold as both base station BS and home base station HBS2 radiate signals in that zone.

The high interference reference zone HIRZ3 is a zone around the home base station HBS3 where mobile terminals performances in downlink are degraded beyond a certain threshold as both base station BS and home base station HBS3 radiate signals in that zone.

The high interference reference zone HIRZ4 is a zone around the home base station HBS4 where mobile terminals performances in downlink are degraded beyond a certain threshold as both base station BS and home base station HBS4 radiate signals in that zone.

In FIG. 1, a server Serv is shown. The server Serv is a core network device that may control plural cells of plural base stations BS and may execute the present algorithm instead of the base station BS. The server Serv may also be named a coordinator.

According to the invention, the base station BS or the server Serv or home base stations HBS performs or perform inter cell interference coordination procedure by:
- determining at least one high interference reference zone for at least one home base station HBS,
- determining the signal transmission power for the at least one home base station HBS, the signal transmission power being such that the at least one interference zone $Zone_{MT}$ is such that the probability that g is lower than or equal to RT in the at least one zone $Zone_{MT}$ equals $P_{out}$, i.e. $Pr(g \leq RT | Zone_{MT}) = P_{out}$.

In the inter cell interference coordination procedure according to the present invention, the transmit power $P_{t,HBS}$ of signals radiated by the at least one home base station HBS, is set in order to ensure a given outage probability $P_{out}$ of a given function g, representing the mobile terminal performance degradation, in a given zone $Zone_{MT}$ around the at least one home base station HBS and where RT is a threshold. The zone $Zone_{MT}$ may be the union of the zones HIRZ1 to HIRZ4 or may be equal to one of the zones HIRZ1 to HIRZ4.

$$P_{t,HBS} \text{ is such that } Pr(g \leq RT | Zone_{MT}) = P_{out}$$

For example, the function g is the ratio between the mobile terminal MT served by the base station BS capacity with home base station HBS signal radiation and mobile terminal MT capacity without home base station HBS signal radiation.

Each high interference reference zone HIRZ1 to HIRZ4 is a small zone around the home base station HBS1 to HBS5 which is represented in FIG. 1 as a circle.

For example, $P_{out}=0.1$ and $RT=0.75$ means that in the high interference reference zone HIRZi, with i=1 to 4, 10% of the mobile terminals MT have a capacity reduction of more than 25% due to the respective home base station HBS1 to HBS5 signal radiation. The home base station HBS1 to HBS5 radio signal transmit power is set in order to reach these values.

The function g may depend on the useful power $P_{U, BS-MT}$ received by mobile terminal MT from the base station BS, on the interfering power $P_{I, BS-MT}$ from neighbouring base stations plus Additive White Gaussian Noise (AWGN) and on the power received by the mobile terminal MT from home base station HBSi $P_{t,HBS}+P_{G,HBS-MT}$, where $P_{G,HBS-MT}$ is the path gain between the home base station HBSi and the mobile terminal MT. $P_{t,HBS}$ is such that:

$$Pr(g(P_{U,BS-MT}, P_{I,BS-MT}, P_{t,HBS}+P_{G,HBS-MT}) \leq RT | Zone_{MT}) = P_{out}$$

It has to be noted here that all power and path gain variables, here and in the following, are expressed in decibel (dB), more precisely log is $\log_{10}$.

According to the example of FIG. 1, the function g may depend on the useful power $P_{U, BS-MT}$ received by mobile terminal MT from the base station BS, on the interfering power $P_{I, BS-MT}$ from neighbouring base stations plus Additive White Gaussian Noise (AWGN) and on the power received by the mobile terminal MT from home base station HBS1 and HBS5 $P_{t,HBS}+P_{G,HBS-MT}$, where $P_{G,HBS-MT}$ is representative of the combination of the path gains between the home base station HBS1 and the mobile terminal MT and between the home base station HBS5 and the mobile terminal MT. $P_{t,HBS}$ is such that:

$$Pr(g(P_{U,BS-MT}, P_{I,BS-MT}, P_{t,HBS}+P_{G,HBS-MT}) \leq RT | Zone_{MT}) = P_{out}$$

According to different modes of realisation of the present invention, the statistical properties of the two first variables $P_{U, BS-MT}$ and $P_{I, BS-MT}$ are the statistical properties over the whole base station BS coverage CE or for a given zone around at least one given home base station HBS, depending if the inter cell interference coordination is global or local.

According to the example of FIG. 1, the statistical properties of the third variable $P_{G,HBS-MT}$ are the statistical properties for a given home base station HBS, i.e., for a given high interference reference zone HIRZi with i=2 to 4 around a given home base station HBSi. This high interference reference zone HIRZi can be defined as a closed outline e.g., a circle around the home base station HBSi, representing from the base station BS side the maximum coverage of the home base station HBSi or the home base station HBSi building boundary.

According to the example of FIG. 1 for the home base stations HBS1 and HBS5, the statistical properties of the third variable $P_{G,HBS-MT}$ are the statistical properties for a combination of path gains of two home base stations HBS1 and HBS5, i.e., for the high interference reference zone HIRZ1 around the home base stations HBS1 and HBS5. This high interference reference zone HIRZ1 can be defined as a closed outline e.g., a circle around the home base stations HBS1 and HBS5, representing from the base station BS side the maximum coverage of the home base stations HBS1 and HBS5 or the home base station HBS 1 and HBS5 building boundary.

For instance, the combination of path gains for the two home base stations HBS1 and HBS5 may be $$P_{G,HBS-MT} = 10 \log 10^{P_{G,HBS,1-MT}/10} + 10^{P_{G,HBS,5-MT}/10}$$

where $P_{G,HBS,1-MT}$ is the path gain between the home base station HBS1 and the mobile terminal MT and $P_{G,HBS,5-MT}$ is the path gain between the home base station HBS5 and the mobile terminal MT.

For simplification purpose, the high interference reference zone HIRZ1 will be considered herein after as the circle around the home base stations HBS 1, representing from the base station BS side the maximum coverage of the home base station HBS 1.

The i-th high interference zone HIRZi can be characterised by a scalar value $r_{DZ,HBSi}$ representing the radius of a circle and being an approximation like an average or a maximum value of the distance between the home base station HBSi and its building boundary in a given direction or its coverage in a given direction.

It has to be noted here that the g function must have the following properties:

Being constant with or increasing with $P_{U, BS-MT}$
Being constant with or increasing with $P_{I, BS-MT}$
Decreasing with $P_{t,HBS} P_{G,HBS-MT}$ Thus, the higher $P_{t,HBS}$ is, the higher the degradation is, which is modelled by a lower g value. We also note that the function g depends on the Signal Interference plus Noise Ratio of the base station BS $SINR_{BS} = P_{U, BS-MT} - P_{I, BS-MT}$.

Thus, the function g can also be expressed as $g(SINR_{BS}, P_{I, BS-MT}, P_{t,HBS} + P_{G,HBS-MT})$ or $g(P_{U, BS-MT}, SINR_{BS}, P_{t,HBS} + P_{G,HBS-MT})$.

Whatever the type of inter cell interference coordination, global or local, the power $P_{t,HBS}$ may be expressed as a function f of three variables which may be potentially random variables, the function increasing f with the two first variables $P_{U, BS-MT}$ and $P_{I, BS-MT}$ and decreasing with the last one $P_{G,HBS-MT}$.

The function f is defined by taking $g(P_{U, BS-MT}, P_{I, BS-MT}, P + P_{G,HBS-MT}) = RT$ with $P = f(P_{U, BS-MT}, P_{I, BS-MT}, RT) - P_{G,HBS-MT}$.

Since f is function of random variables, P is itself a function of random variables. The cumulative density function of this random variable may be computed and $P_{t,HBS}$ may be set to the value of P corresponding to the value $P_{out}$ of the cumulative density function:

$$P_{t,HBS} = Q_{-P_{G,HBS-MT} + P_{U,BS-MT}, P_{I,BS-MT}, RT} P_{out}$$

where $Q_u(P_{out})$ is the quantile at $P_{out}$ of the function u which is a function of random variables.

A quantile $u_Q = Q_u(P_{out})$ is the value $u_Q$ of u such that the probability that u is lower than $u_Q$ is equal to $P_{out}$.

The function f is directly related to the degradation function g. The function f is always increasing with $P_{U, BS-MT}$ and $P_{I, BS-MT}$ and decreasing with RT.

Indeed, an increased $P_{U, BS-MT}$ means that mobile terminals MT are less sensitive to home base station HBS interference. An increased $P_{I, BS-MT}$ means that the interference from base station BS becomes more dominant and the home base station HBS impact is reduced. Finally, an increased RT means that the criterion is stricter and the home base station HBS transmit power must be reduced in order to satisfy the base station BS performance criterion.

The transmit power $P_{t,HBS}$ follows the same trends. The transmit power $P_{t,HBS}$ is also increasing with $P_{out}$ by the quantile definition because higher outage probability $P_{out}$ is allowed. For a same variance of $P_{G,HBS-MT}$, it is also decreasing with the average of $P_{G,HBS-MT}$, since an increased $P_{G,HBS-MT}$ means higher impact on the mobile terminals MT.

In practice, f should also take into account the performance saturation when the signal to interference plus noise ratio (SINR) increases beyond a maximum signal interference plus noise ratio value $SINR_{max}$.

Indeed, the system peak rate is always limited by the higher order modulation scheme, the higher coding rate, the Multiple Input Multiple Output scheme with higher spectral efficiency.

This saturation can be easily introduced in the inter cell interference coordination method by replacing $P_{I, BS-MT}$ by $\max(P_{I, BS-MT}, P_{U, BS-MT} - 10 \cdot \log(SINR_{max}))$.

In order to perform high interference reference zone HIRZ based inter cell interference coordination method, statistical properties of the involved variables are needed. These properties may be derived from models or measurements.

Depending on the type of inter cell interference coordination method, global or local, the random variables are not considered on the same geographical zones.

In global inter cell interference coordination, the transmit power $P_{t,HBS}$ is the same for each home base station HBS1 to HBS5 comprised in the cell CE.

The transmit power of each home base station HBS1 to HBS5 is set in order to guarantee a given outage probability on a global zone $Zone_{MT}$ obtained by the union of all individual zones HIRZ1 to HIRZ4 around home base stations HBS1 to HBS5.

The inter cell interference coordination is performed by the base station BS or by the server Serv. The base station BS or the server Serv then informs the home base stations HBS of $P_{t,HBS}$ or home base stations HBS compute it by themselves.

If the base station BS does not know the exact position of all the home base stations HBS, the base station BS assumes that there are home base stations HBS everywhere in the cell CE. Thus, the statistical properties of $P_{U, BS-MT}$ and $P_{I, BS-MT}$ are computed for all mobile terminals locations in the cell CE of the base station BS.

On the other hand, the statistical properties of $P_{G,HBS-MT}$ are only computed on the zone around home base stations HBS, since this is the zone which is of importance for $P_{t,HBS}$ determination and averaged over all HBSs.

$$P_{t,HBS} = -\overline{P}_{G,HBS-MT} Zone_{MT} + Q_{P_{G-HBS-MT} - \overline{P}_{G,HBS-MT} Zone_{MT} + P_{U,BS-MT}, P_{I,BS-MT}, RT \setminus Zone_{MT}} P_{out}$$

where $\overline{x}$ denotes the average of x, $Q_{u|Zone_{MT}} P_{out}$ is the quantile at $P_{out}$, i.e., the value such that the cumulative density function of u equals $P_{out}$ of the function u on the union zone $Zone_n$ of HIRZ1 to HIRZ4. $\overline{P}_{G,HBS-MT} Zone_{MT}$ is the average of the path gain between the home base station HBSi with i=2 to 4 and the mobile terminals MT in its high interference reference zone HIRZi over all home base stations HBS and the combination of the path gains between the home base stations HBS1 and HBS5 and the mobile terminals MT in their high interference reference zone HIRZ1 over all home base stations HBS.

In local inter cell interference coordination with high interference reference zone HIRZ equalisation, each zone HIRZi with i=2 to 4 is a zone around a home base station HBSi, and is individually considered. The transmit power $P_{t,HBS}(HBSi)$ is specific to each home base station HBS and this specific power $P_{t,HBS}(HBSi)$ is set in order to guarantee a given outage probability on the zone HIRZi.

The inter cell interference coordination is performed independently for each home base station HBSi.

In local inter cell interference coordination with high interference reference zone HIRZ equalisation, the zone HIRZ1 is a zone around the home base stations HBS1 and HBS5 and is individually considered. The transmit power $P_{t,HBS}(HBS1)$ is equal to the transmit power $P_{t,HBS}(HBS5)$ and this specific power $P_{t,HBS}(HBS1)$ or $P_{t,HBS}(HBS5)$ is set in order to guarantee a given outage probability on the zone HIRZ1.

By applying the same approach as global inter cell interference coordination using the cumulative density function of $f(P_{U,BS-MT}, P_{I,BS-MT}, RT) - \overline{P}_{G,HBS-MT}$ on HIRZi, with i=1 to 4, the transmit power $P_{t,HBS}$(HBSi) is obtained:

$$P_{t,HBS}HBSi = -\overline{P}_{G,HBS-MT}HIRZi + Q_{P_{G,HBS-MT}-\overline{P}_{G,HBS-MT}HIRZi + f P_{U,BS-MT}, P_{I,BS-MT}, RT)HIRZi}P_{out}$$

where $\overline{P}_{G,HBS-MT}$ HIRZi is, for i=2 to 4 the average of the path gain between the home base station HBSi and the mobile terminals MT in the zone HIRZi, where $\overline{P}_{G,HBS-MT}$ HIRZi is, for i=1, the average of the combination of the path gains between the home base stations HBS1 and HBS5 and the mobile terminals MT in the zone HIRZ1.

For the sake of simplicity, the path gain between home base station HBS5 and the mobile terminals MT in the zone HIRZ1 will not be considered hereinafter.

A skill man of the art will transpose the simplified following formulas in case where at least two home base stations at located within the same High Interference Reference zone as disclosed in the zone HIRZ1 of FIG. 1.

In some cases, $f(P_{U,BS-MT}, P_{I,BS-MT}, RT)$ can be considered as deterministic or as having a variance much lower than $\overline{P}_{G,HBS-MT}$ on Zone$_{MT}$. In this case, the function f can be extracted from the quantile, taking mean values as argument:

$$P_{t,HBS}HBSi = -\overline{P}_{G,HBS-MT}Zone_{MT} + Q_{P_{G,HBS-MT}-\overline{P}_{G,HBS-MT}Zone_{MT}|Zone_{MT}}P_{out} + f(\overline{P}_{U,BS-MT}Zone_{MT}, \overline{P}_{I,BS-MT}Zone_{MT}; RT)$$

It has to be noted here that, depending on the type of variable or on scenario, the variables involved in the transmit power computation can be random or deterministic.

A variable may be random because there are fundamentally different possible values. It might be the case for $P_{U, BS-MT}$ and $P_{I, BS-MT}$. For example, when global inter cell interference coordination is performed, the values of $P_{U, BS-MT}$ and $P_{I, BS-MT}$ are taken over the whole base station BS cell CE.

For example, when local inter cell interference coordination is performed and the shadowing correlation distance is low compared to the size of the zone HIRZi, the powers $P_{U, BS-MT}$ and $P_{I, BS-MT}$ may be random. For example, when local inter cell interference coordination is performed at a time scale which is high compared to the shadowing correlation time, the powers $P_{U, BS-MT}$ and $P_{I, BS-MT}$ may be random.

A variable may be random because there is a lack of knowledge on the variable. The variable is considered as random even if it has a fixed value over the considered zone HIRZi. For instance, if the location information is taken into account, for example, by using a model where the logarithm of the mean path gain is a linear function of the logarithm of the distance, the shadowing information is not available and the powers $P_{U, BS-MT}$ and $P_{I, BS-MT}$ become random variables due to the unknown shadowing with local inter cell interference coordination, even if the inter cell interference coordination time scale is low and the shadowing correlation distance high.

For example, when there is a single measurement between two inter cell interference coordination updates of the powers $P_{U, BS-MT}$ and $P_{I, BS-MT}$ or the path gain $P_{G, HBS-MT}$, even if it varies over the high interference reference zone HIRZi of interest, the powers $P_{U, BS-MT}$ and $P_{I, BS-MT}$ or path gain $P_{G, HBS-MT}$ become random variables.

For example, without temporal variations, the variance of $P_{U, BS-MT}$ on the zone HIRZi depends on the shadowing correlation distance. If the correlation distance increases, the variance of $P_{U, BS-MT}$ tends to zero, if the shadowing correlation distance decreases down to zero, the variance of $P_{U, BS-MT}$ becomes twice the variance of the shadowing. If the duration between two inter cell interference coordination updates increases, we can obtain many measurements between two inter cell interference coordination updates, assuming temporal variation or spatial variation and mobile terminal mobility, and decrease this variance.

The path gain $P_{G, HBS-MT}$ is generally considered as a random variable, since around the home base station HBSi, we observe different path gain values depending on the mobile terminal MT position.

For the path gain $P_G$ between a base station BS and a mobile terminal, the following model can be considered:

$$P_G t,x = \overline{P}_G x + \sigma_{BS,Sh,space} \chi_{ConstantOverTime} x + \sigma_{BS,Sh,time} \chi_{TimeVariable} x,t$$

$\chi_{ConstantOverTime}$ x and $\chi_{TimeVariable}$ x,t are Gaussian standard variables with exponential correlation. The total shadowing variance is:

$$\sigma BS_{eNB,Sh} = \sqrt{\sigma_{BS,Sh,space}^2 + \sigma_{BS,Sh,time}^2}, \text{ where } Sh$$
denotes the shadowing.

Usually, we have the standard deviation of the shadowing $\sigma_{BS,Sh,time} \ll \sigma_{BS,Sh,space}$.

For example, $\sigma_{BS,Sh,tme}$ is around a few dB and $\sigma_{BS,Sh,space}$ in the order of 8 dB for a log(P) vs. log(d) linear model as a function of distance d for mean path loss plus antenna angular selective attenuation for the variable $\overline{P}_G$ x.

The standard deviation that is considered should depend of the HIRZi size and the time duration between inter cell interference coordination updates.

When a single measurement is performed for each inter cell interference coordination update, the measurement is considered as the mean of a Gaussian distribution representing the shadowing in the given zone Zone$_{MT}$.

However, if the random shadowing on the given zone Zone$_{MT}$ during the inter cell interference coordination period has a standard deviation $\sigma$ and in order to take the estimation standard deviation into account, the standard deviation to be considered is $\sqrt{2}\sigma$. $\sigma^2$ is the expectation of the empirical variance on the given zone Zone$_{MT}$ during the inter cell interference coordination period, i.e., the time between two inter cell interference coordination updates:

$$\sigma^2 = \lim_{N \to \infty} \frac{1}{N} E\left[\sum_{j=0}^{N-1}\left(P_{U,BS-MT,j} - \frac{1}{N}\sum_{j'=0}^{N-1} P_{U,BS-MT,j'}\right)^2\right]$$

where E denotes the mean over all shadowing realisations, the sum is over all N time/space samples on the given zone Zone$_{MT}$ during the inter cell interference coordination period for a discrete definition, and each j and each j' corresponds to one location in the zone Zone$_{MT}$ at one instant.

Note that $\sigma < \sigma_{BS,Sh}$ and $\sigma$ is approximately equal to null value for a large correlation distance and a large correlation time with respect to the zone Zone$_{MT}$ and inter cell interference coordination period.

The probability distributions of the different variables and so the quantile of the global variable may be obtained using two different ways.

A first way is to use a modelling approach like path loss models and Gaussian models. For that, position measurements of the mobile terminal MT need to be obtained because path loss models are generally related to the relative position of the mobile terminal MT from the serving base station BS or only the distance between base station BS and the mobile terminal MT need to be obtained.

It has to be noted here that, the distance or relative position of the closest home base station HBS from the serving base station BS may be used instead of the distance or relative position of the mobile terminal MT from the serving base station BS.

A second way is a measurement approach wherein a set of received power measurements is used. The whole set of measurements may be stored in order to keep a good knowledge of the statistical dependency between variables or the set is used to derive the mean and standard deviation of a Gaussian variable, i.e., the statistics of the measured variable is approximated by a Gaussian distribution.

The models depend on the definition of the zone $Zone_{MT}$. For example, for the mean path gain between the home base station HBSi and the mobile terminals MT $\overline{P}_{G,HBS-MT}$ HIRZi and a zone equivalent to a circle centered on the home base station HBSi with radius $r_{DZ,HBSi}$, we have, $$\overline{P}_{G,HBS-MT} HIRZi = $$
$$\overline{P}_{G,HBS-MT} r_{DZ,HBSi} = G_0^{HBSi} + G_{pw}^{HBSi} + $$
$$G_{ant,HBSi} + G_{ant,MT} - 10\alpha^{HBSi-out} \log r_{DZ,HBSi}$$

where $\overline{x}$ is the mean of x, $G_0^{HBSi}$ is the reference path gain including antenna effects, $G_{pw}^{HBSi}$ is the mean penetration gain in the buildings, $G_{ant,HBSi}$ and $G_{ant,MT}$ are respectively the home base station HBS and mobile terminal antenna gains and $\alpha^{HBSi-out}$ is the attenuation exponent. It has to be noted here that the variable component of the path gain may be considered as Gaussian with the standard deviation of the shadowing.

The model for $P_{U,BS-MT}$ and $P_{I,BS-MT}$ is a function that depends on the relative position of the mobile terminal MT with respect to the surrounding base stations not shown in FIG. 1 and the antenna diagram or on the distance between the base station BS and the mobile terminal MT and on the transmit power of the surrounding base stations.

The variable component for $P_{U,BS-MT}$ and $P_{I,BS-MT}$ depends on $Zone_{MT}$, in particular its size, on correlation properties and on standard deviation of shadowing.

According to the invention, the mean of function f may be expressed as:

$$\hat{f} = f \overline{P}_{U,BS-MT}, \overline{P}_{I,BS-MT}; RT \text{ taken on the zone HIRZi,}$$

where $\hat{x}$ is the estimate of x, $\overline{P}_{U,BS-MT}$ and $\overline{P}_{I,BS-MT}$ are respectively the estimate means of $P_{U,BS-MT}$ and $P_{I,BS-MT}$ on the zone HIRZi.

The model for quantile evaluation may be based on different approaches.

The first approach is an empirical one.

For example, the model for quantile evaluation is defined with Monte-Carlo samples $$P_{U,BS-MT,j}, P_{I,BS-MT,j}, P_{G,HBS-MT,j\,j=1\,\ldots\,N_{Measures}}$$

using $$fP_{U,BS-MT,j}, P_{I,BS-MT,j}; RT, P_{G,HBS-MT,j\,j=1\,\ldots\,N_{Measures}}.$$

Measurements of $P_{U,BS-MT}$, $P_{I,BS-MT}$ and $P_{G,HBS-MT}$ may be processed in the first approach or samples of $P_{U,BS-MT}$, $P_{I,BS-MT}$ and $P_{G,HBS-MT}$ may be generated by Monte-Carlo method based on a given model.

According to the first approach:

$$P_{t,HBS} = -\hat{\overline{P}}_{G,HBS-MT} + Q_{Data,\overline{P}_{G,HBS-MT} - P_{G,HBS-MT,j} + f_{j\,j=1\,\ldots\,N_{Measures}}} P_{out}$$

$$f_j = fP_{U,BS-MT,j}, P_{I,BS-MT,j}; RT$$

where $$Q_{Data,X_{j\,j=1\,\ldots\,N}}$$

P is the quantile corresponding to an empirical set of samples $X_{j\,j=1\,\ldots\,N}$ at a probability P.

The second approach is a Gaussian-model based method. The model for quantile evaluation is a Gaussian variable with a given mean and variance $\sigma^2$, computed from the estimate of mean $\hat{f}$ of function f, the mean path-gain $\overline{P}_{G,F-MT}$ $Zone_{MT}$ between the home base station HBS and the mobile terminals.

According to the second approach $P_{t,HBS} = Y + \sigma Q_N P_{out}$ where $Q_N(P_{out})$ is the quantile at $P_{out}$ of the cumulative density function of Gaussian distribution.

$\sigma = \sqrt{\sigma_f^2 + \sigma_{P_{G,HBS-MT}}^2}$ for example, where $\sigma_f^2$ is the variance of function f and $\sigma_{P_{G,HBS-MT}}^2$ is the variance of the path gain $P_{G,HBS-MT}$.

According to a first variant of the second approach, the parameters are obtained without simplification which will be disclosed hereinafter. That first variant is used on measurements of $P_{U,BS-MT}$, $P_{I,BS-MT}$ and $P_{G,HBS-MT}$ or on samples of $P_{U,BD-MT}$, $P_{I,BS-MT}$ and $P_{G,HBS-MT}$ generated by Monte-Carlo method based on a given model or on a model of $P_{U,BS-MT}$, $P_{I,BS-MT}$ and $P_{G,HBS-MT}$.

According to the first variant of the second approach:

$$Y = -\overline{P}_{G,HBS-MT} \hat{f}$$

where $$\hat{f} \text{ may be equal to } \frac{1}{N_{Measures}} \sum_{j=1}^{N_{Measures}} f_j$$

or an analytic function of parameters like the mean and variance of $P_{U,HB-MT}$ and $P_{I,BS-MT}$ and where $N_{Measures}$ is the number of measures.

$$P_{t,HBS} = -\overline{P}_{G,HBS-MT} \hat{f} + \sigma Q_N P_{out}$$

According to a second variant of the second approach, the parameters are obtained with simplification using the mean and standard deviation of $P_{U,BS-MT}$ and $P_{I,BS-MT}$. The model for quantile evaluation is based on measurements of $P_{U,BS-MT}$, $P_{I,BS-MT}$ and $P_{G,HBS-MT}$ or a model of $P_{U,BS-MT}$, $P_{I,BS-MT}$ and $P_{G,HBS-MT}$.

According to the second variant of the second approach:

$$Y = -\overline{P}_{G,HBS-MT} + f \overline{P}_{U,BS-MT}, \overline{P}_{I,BS-MT}; RT$$

$$P_{t,HBS} = -\overline{P}_{G,HBS-MT} + f \overline{P}_{U,BD-MT}, \overline{P}_{I,BS-MT}; RT + \sigma Q_N P_{out}$$

The third approach is a Gaussian-mixture-model based method. The model for quantile evaluation is a mixture of Gaussian distributions, each Gaussian distribution having the same elementary standard deviation, using Monte-Carlo samples and a Gaussian model.

According to the third approach:

$$P_{t,HBS} = Y + Q_{GMM,\sigma,X_{j\,j=1\,\ldots\,N_{Measures}}} P_{out}$$

where $$Q_{GMM,\sigma,m_{j\,j=1\,\ldots\,N}}$$

P is the quantile corresponding to a Gaussian Mixture Model (GMM) with standard deviation $\sigma$ and means $m_{j\,j=1\,\ldots\,N}$ at a probability $P_{out}$.

According to a first variant of the third approach, the parameters are obtained without simplification which will be disclosed hereinafter. The first variant of the third approach is used on measurements of $P_{U,BS-MT}$ and $P_{I,BS-MT}$ and a Gaussian model for $P_{G,HBS-MT}$ or on samples of $P_{U,BS-MT}$ and $P_{I,BS-MT}$ generated by a Monte-Carlo method based on a given model and a Gaussian model for $P_{G,HBS-MT}$.

According to the first variant of the third approach:

$$\sigma = \sigma_{P_{G,HBS-MT}}$$

$$Y = -\overline{P}_{G,HBS-MT}$$

$$X_j = f_j$$

$$P_{t,HBS} = -\overline{P}_{G,HBS-MT} + Q_{GMM,\sigma_{P_{G,HBS-MT}},f_j j=1 \ldots N_{Measures}}^{P_{out}}$$

According to a second variant of the third approach, the parameters are obtained with simplification using the mean and standard deviation of $P_{U,BS-MT}$ and $P_{I,BS-MT}$. The second variant of the third approach is used on a model of $P_{U,BS-MT}$ and $P_{I,BS-MT}$ and measurements of $P_{G,HBS-MT}$.

According to the second variant of the third approach:

$$\sigma = \sigma_f$$

$$Y = f \hat{P}_{U,BS-MT}, \hat{P}_{I,BS-MT}; RT$$

$$X_j = -P_{G,HBS-MT,j}$$

$$P_{t,HBS} = f \hat{P}_{U,BS-MT}, \hat{P}_{I,BS-MT};$$

$$RT + Q_{GMM,\sigma_f,-P_{G,HBS-MT},j j=1 \ldots N_{Measures}}^{P_{out}}$$

It has to be noted here that for global inter cell interference coordination, it is important not to neglect the statistical dependency between $P_{U,BS-MT}$ and $P_{I,BS-MT}$.

According to the invention different inter cell interference coordination criteria may be used.

$P_{t,HBS}$ is such that:

$$Prg P_{U,BS-MT}, P_{I,BS-MT}, P_{t,HBS} + P_{G,HBS-MT} \leq RT|Zone_{MT} = P_{out}.$$

$g\ P_{U,BS-MT},\ P_{I,BS-MT},\ P_{t,HBS}+P_{G,HBS-MT}$ is a constant or increasing function of $P_{U,BS-MT}$ and $P_{I,BS-MT}$ and a decreasing function of $P_{I,HBS-MT}=P_{t,HBS}+P_{G,HBS-MT}$.

According to the invention, g may be defined according to plural criteria.

For example, g may be defined according to a ratio of the base station BS interference level and the received power from home base station HBS (difference in log domain):

$$gP_{U,BS-MT}, P_{I,BS-MT}, P_{I,HBS-MT} = P_{I,BS-MT} - P_{I,HBS-MT}$$

g may be defined according to a ratio of SINR functions, SINR being not defined in decibel but in the linear domain:

$$g\ P_{U,BS-MT},\ P_{I,BS-MT},\ P_{I,HBS-MT} = \frac{\tilde{g}\ SINR_{wF}}{\tilde{g}\ SINR_{woF}}$$

where $SINR_{wF}$ is the SINR including the home base stations HBS interferences and $\tilde{g}$ is a function which depends on the SINR.

$$SINR_{wF} = \frac{10^{0.1 P_{U,BS-MT}}}{10^{0.1 P_{I,BS-MT}} + 10^{0.1 P_{I,HBS-MT}}}$$

and $SINR_{woF}$ is the SINR not including the home base stations HBS interferences $$SINR_{woF} = \frac{10^{0.1 P_{U,BS-MT}}}{10^{0.1 P_{I,BS-MT}}}.$$

The ratio defining g may be the ratio of SINRs or the ratio of Shannon capacities or the ratio of modelled spectral efficiency, or the ratio of empirical spectral efficiency.

If the inter cell interference coordination criterion is the base station home base station power ratio:

$$gP_{U,BS-MT}, P_{I,BS-MT}, P_{I,HBS-MT} = P_{U,BS-MT} - P_{I,HBS-MT},$$

$fP_{U,BS-MT}, P_{I,BS-MT}; RT = P_{U,BS-MT} - RT$ and the standard deviation of f is $\sigma_{P_{U,BS-MT}}$.

If the inter cell interference coordination criterion is the base station home base station interference ratio:

$$gP_{U,BS-MT}, P_{I,BS-MT}, P_{I,HBS-MT} = P_{I,BS-MT} - P_{I,HBS-MT},$$

$fP_{U,BS-MT}, P_{I,BS-MT}; RT = P_{I,BS-MT} - RT$ and the standard deviation of f is $\sigma_{P_{I,BS-MT}}$.

From a general point of view, if the inter cell interference coordination criterion is a SINR functions ratio:

$$g\ P_{U,BS-MT},\ P_{I,M-MT},\ P_{I,HBS-MT} = \frac{\tilde{g}\ SINR_{wF}}{\tilde{g}\ SINR_{woF}},$$

$$f\ P_{U,BS-MT},\ P_{I,BS-MT};$$

$$RT = 10\log\left(\frac{10^{0.1 P_{U,BS-MT}}}{\tilde{g}^{-1}(RT \times \tilde{g}(10^{0.1 P_{U,BS-MT} - P_{I,BS-MT}}))} - 10^{0.1 P_{I,BS-MT}}\right)$$

and the standard deviation of f is $\leq \sigma_{P_{I,BS-MT}}$.

In practice, we can add to SINR functions a saturation level (for instance, reflecting that the spectral efficiency is limited in practice by the system specification, i.e., by the modulation/channel coding/space-time coding with highest spectral efficiency). For a limitation like $\tilde{g}\ SINR\ 1_{SINR > SINR_{Max}} = \tilde{g}\ SINR_{max}$ where $1_X$ is the indicator function (equal to 1 for set X and 0 otherwise), we can simply replace $P_{I,BS-MT}$ by max $P_{I,BS-MT}, P_{U,BS-MT} - 10 \log SINR_{max}$.

If the inter cell interference coordination criterion is the SINR ratio:

$$g\ P_{U,BS-MT},\ P_{I,BS-MT},\ P_{I,HBS-MT} = \frac{\tilde{g}\ SINR_{wF}}{\tilde{g}\ SINR_{woF}}\ \text{and}$$

$$\tilde{g}\ SINR - SINR,$$

$$f\ P_{U,BS-MT},\ P_{I,BS-MT};$$

$$RT = 10\log\left(\frac{1}{RT} - 1\right) + P_{I,BS-MT}$$

and the standard deviation of f is equal to $\sigma_{P_{I,BS-MT}}$.

If the inter cell interference coordination criterion is the Shannon capacity ratio:

$$g\left(P_{U,BS-MT}, P_{I,BS-MT}, P_{I,HBS-MT}\right) = \frac{\tilde{g}(SINR_{wF})}{\tilde{g}(SINR_{woF})}$$

and $\tilde{g}(SINR) = a \log(1+SINR)$ where a is a pre-defined scalar value e.g., in order to take into account multiple antenna transmission, $$f\left(P_{U,BS-MT}, P_{I,BS-MT}\right):$$

$$RT = 10\log\left(\frac{10^{0.1 P_{U,BS-MT}}}{(1+10^{0.1 P_{U,BS-MT}-P_{I,BS-MT}})^{RT}-1} - 10^{0.1 P_{I,BS-MT}}\right)$$

and the standard deviation of f is $\leq \sigma_{P_{I,BS-MT}}$.

If the inter cell interference coordination criterion is a modelled spectral efficiency ratio:

$$g\left(P_{U,BS-MT}, P_{I,M-MT}, P_{I,HBS-MT}\right) = \frac{\tilde{g}(SINR_{wF})}{\tilde{g}(SINR_{woF})}$$

and $\tilde{g}(SINR) = a \times \log(1 + b \times SINR)$ where a and b are pre-defined scalar values set in order to take into account small-scale channel, scheduling behaviour, multiple antenna transmission $$f\left(P_{U,BS-MT}, P_{I,BS-MT}\right):$$

$$RT = 10\log\left(\frac{b 10^{0.1 P_{U,BS-MT}}}{(1+b 10^{0.1 P_{U,BS-MT}-P_{I,BS-MT}})^{RT}-1} - 10^{0.1 P_{I,BS-MT}}\right)$$

and the standard deviation of f is $\leq \sigma_{P_{I,BS-MT}}$.

Figure 2:
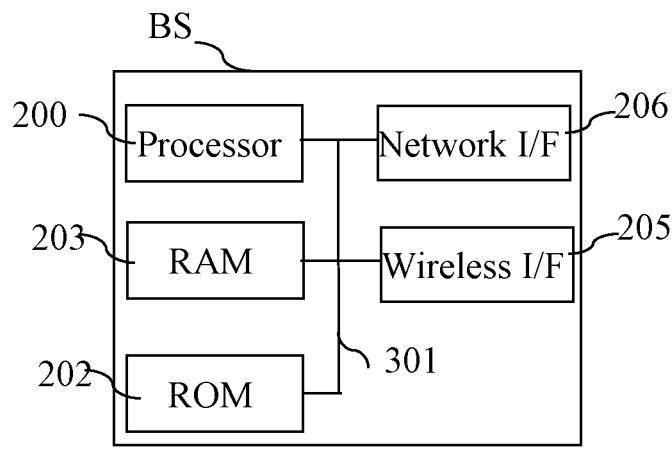
FIG. 2 is a diagram representing the architecture of a base station in which the present invention is implemented.

FIG. 2 is a diagram representing the architecture of a base station in which the present invention is implemented.

The base station BS has, for example, an architecture based on components connected together by a bus 201 and a processor 200 controlled by the programs as disclosed in FIGS. 4 and 5.

The bus 201 links the processor 200 to a read only memory ROM 202, a random access memory RAM 203, a wireless interface 205 and a network interface 206.

The memory 203 contains registers intended to receive variables and the instructions of the programs related to the algorithms as disclosed in FIGS. 4 and 5.

The processor 200 controls the operation of the network interface 206 and of the wireless interface 205.

The read only memory 202 contains instructions of the programs related to the algorithms as disclosed in FIGS. 4 and 5, which are transferred, when the base station BS is powered on, to the random access memory 203.

The base station BS may be connected to a telecommunication network through the network interface 206. For example, the network interface 206 is a DSL (Digital Subscriber Line) modem, or an ISDN (Integrated Services Digital Network) interface, etc. Through the network interface 206, the base station BS may transfer messages to the core network of the wireless cellular telecommunication network.

The wireless interface 205 and the network interface 206 are the resources of the base station BS used by a mobile terminal in order to access to the wireless cellular telecommunication network when the mobile terminal establishes or receives a communication with a remote telecommunication device.

Figure 3:
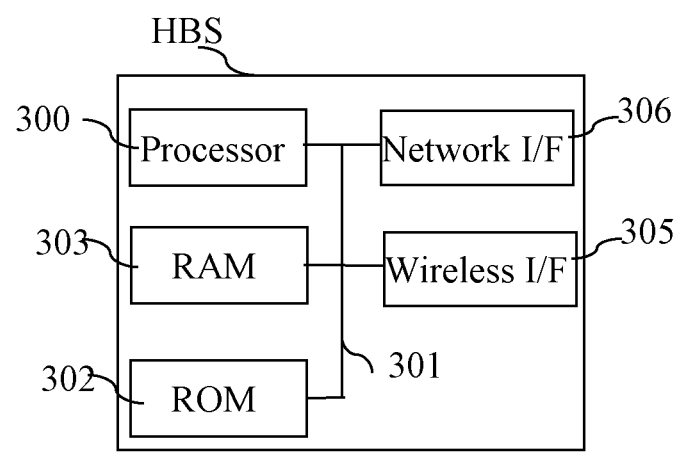
FIG. 3 is a diagram representing the architecture of a home base station in which the present invention is implemented.

FIG. 3 is a diagram representing the architecture of a home base station in which the present invention is implemented.

The home base station HBS has, for example, an architecture based on components connected together by a bus 301 and a processor 300 controlled by the programs as disclosed in FIG. 4 or 5 or 6 or 7 or 8 or 9.

The bus 301 links the processor 300 to a read only memory ROM 302, a random access memory RAM 303, a wireless interface 305 and a network interface 306.

The memory 303 contains registers intended to receive variables and the instructions of the programs related to the algorithms as disclosed in FIG. 4 or 5 or 6 or 7 or 8 or 9.

The processor 300 controls the operation of the network interface 306 and of the wireless interface 305.

The read only memory 302 contains instructions of the program related to the algorithms as disclosed in FIG. 4 or 5 or 6 or 7 or 8 or 9, which are transferred, when the home base station HBS is powered on, to the random access memory 303.

The home base station HBS may be connected to a telecommunication network through the network interface 306. For example, the network interface 306 is a DSL (Digital Subscriber Line) modem, or an ISDN (Integrated Services Digital Network) interface or a wireless link linking the home base station HBS to the base station BS, etc. Through the network interface 306, the home base station HBS may transfer messages to the core network of the wireless cellular telecommunication network.

The wireless interface 305 and the network interface 306 are the resources of the home base station HBS used by a mobile terminal in order to access to the wireless cellular telecommunication network when the mobile terminal establishes or receives a communication with a remote telecommunication device.

The wireless interface 305 may also comprise a positioning system like a Global Navigation Satellite System (GNSS) in order to obtain information representative of the location of the home base station HBS.

FIG. 4 discloses a general algorithm according to the present invention.

The present algorithm may be executed by the server Serv or by a base station BS or by at least one home base station.

At step S400, a pre-computation is performed as it will be disclosed hereinafter in reference to FIGS. 7 and 9

At next step S401, measurements are performed by at least one mobile terminal and/or at least one home base station HBS.

At next step S402, the measurements are gathered by the base station BS or at least one home base station HBS or by the server Serv.

At next step S403, the transmission power is computed for at least one home base station HBS by the base station BS or by the server Serv or by at least one home base station HBS.

After that, the algorithm returns to step S401.

FIG. 5 discloses a first example of inter cell interference coordination algorithm according to the present invention.

In the example of FIG. 5, a global inter cell interference coordination is performed with control of base station BS degradation. In other words the same transmission power is used by each home base station HBS1 to HBS4.

The control of base station degradation is more precisely the control of the degradation of signals radiated by the base station BS within the zone $Zone_{MT}$ which is equal to the union of HIRZ1 to HIRZ4.

Global inter cell interference coordination may be performed with both model- and measured data based values. For the random part a Gaussian model is considered, measured data are used for evaluating the mean and variance of the Gaussian variable $P_{I,BS-MT}$. The general formula for the constant transmission power of the home base stations HB1 to HBS4 over the cell CE is:

$$P_{t,HBS} = -\overline{P}_{G,HBS-MT} + \sigma Q_N P_{out} + f \overline{P}_{U,BS-MT}, \overline{P}_{I,BS-MT}; RT$$

where $Q_N$ is the quantile of a standard Normal distribution, i.e., a Gaussian distribution with zero mean and unit variance.

In addition if the SINR ratio is considered for measuring the degradation g of the mobile terminal performance, $$g\ P_{U,BS-MT}, P_{I,BS-MT},$$

$$P_{t,HBS} + P_{G,HBS-MT} = \frac{\frac{10^{0.1 P_{u,BS-MT}}}{10^{0.1 P_{I,BS-MT}} + 10^{0.1 P_{t,HBS} + P_{G,HBS-MT}}}}{\frac{10^{0.1 P_{U,BS-MT}}}{10^{0.1 P_{I,BS-MT}}}} =$$

$$\frac{10^{0.1 P_{I,BS-MT}}}{10^{0.1 P_{I,BS-MT}} + 10^{0.1 P_{t,HBS} + P_{G,HBS-MT}}}$$

With $g\ P_{U,BS-MT}, P_{I,BS-MT}, y=RT$ and $y=P_{t,HBS}+P_{G,HBS-MT}$, we derive, $$y = f\ P_{U,BS-MT}, P_{I,BS-MT};$$

$$R = 10\log\left(\frac{1}{RT} - 1\right) + P_{I,BS-MT}.$$

For example, if the base station BS interference received power $P_{I,BS-MT}$ on the zone HIRZi of the home base station HBSi for all the home base stations HBS1 to HBS4 is a Gaussian random value, the mean $\overline{P}_{I,BS-MT}$ and variance $\sigma_{P_{I,BS-MT}}^2$ are estimated by the base station BS with collected interference measurements by different mobile terminals MT on signals transferred by the neighbouring base stations.

In order to control the degradation of the mobile terminal MT performance, quantitative information of path gain from home base station HBSi to mobile terminals MT in the zone HIRZi needs to be obtained.

To that aim, a classic propagation model with shadowing and a circular zone HIRZi centered on home base station HBSi of radius $r_{DZ,HBSi}$ are considered.

It has to be noted here that the radius $r_{DZ,HBSi}$ may correspond to half size of the building in which the home base station HBSi is located.

The home base station HBSi to mobile terminal path gain follows a Gaussian distribution which is approximatively equal to $N\ \overline{P}_{G,HBS-MT}, \sigma_{P_{G,HBS-MT}}^2$ with, $$\overline{P}_{G,HBS-MT} = G_0^{HBS} + G_{pw}^{HBS} + G_{ant,HBS} + G_{ant,MT} - 10\alpha^{HBS-out} \log r_{DZ,MT}$$

$\sigma_{P_{G,HBS-MT}} = \sigma_{HBS,Sh}$ where $N\ \mu, \sigma^2$ is a Normal or Gaussian distribution with mean $\mu$ and variance $\sigma^2$.

Data $\hat{\sigma}_{P_{I,BS-MT}}$ and $\overline{P}_{I,BS-MT}$ may be empirical estimates of standard deviation and mean of $P_{I,BS-MT}$ on the whole cell CE of the base station BS. At the base station BS, the transmit power $P_{t,HBS}$ is computed:

$$P_{t,HBS} = -G_0^{HBS} - G_{pw}^{HBS} - G_{ant,HBS} - G_{ant,MT} + 10\alpha^{HBS-out} \log r_{DZ,MT} +$$

$$Q_N P_{out} \sqrt{\sigma_{HBS,Sh}^2 + \hat{\sigma}_{P_{I,BS-MT}}^2} + 10\log\left(\frac{1}{RT} - 1\right) + \hat{\overline{P}}_{I,BS-MT}$$

For example, let consider the following numerical example:

$r_{DZ,MT} = 6$, $G_{pw}^{HBS} = 20$ dB,

For example:

$$G_0^{HBS} + G_{pw}^{HBS} + G_{ant,HBS} + G_{ant,MT} =$$

$$- \underset{\text{Reference path loss}}{30.5} - \underset{\text{Wall penetration loss}}{20} + \underset{\text{Antenna gain}}{5+0} = -45.5\ \text{dB}$$

$\alpha^{HBS-out} = 3.67$ and $\sigma_{HBS,Sh} = 10$ dB

For an outage probability $P_{out}=0.1$ and threshold $RT=0.5$, which means that in 10% of cases in zone $Zone_{MT}$ which is the union of HIRZ1 to HIRZ4, the SINR on signals transferred by the base station BS is divided by more than two, we have for each home base station HBS1 to HBS4:

$$P_{t,HBS} =$$

$$--45.5 - 28 - 1.2816\sqrt{\hat{\sigma}_{P_{I,BS-MT}}^2 + 10^2} - 5 + 20 + 10\log\left(\frac{1}{0.5} - 1\right) +$$

$$\hat{\overline{P}}_{I,BS-MT} = 88.5 + -1.2816\sqrt{\hat{\sigma}_{P_{I,BS-MT}}^2 + 10^2} + \hat{\overline{P}}_{I,BS-MT}$$

This power value is sent or made available, for example via the server Serv or via the base station BS, to each home base station HBS1 to HBS4.

It has to be noted here that in a variant, the mean path gain from the home base station HBSi to mobile terminals in zone HIRZi can also be estimated by home base station HBSi based on mobile terminals path gain measurements and not just from a propagation model.

The path gain measurements could be made by mobile terminals MT in HIRZi before handover from the base station BS to home base station HBSi and transmitted to home base station HBSi after handover has been completed. In this case, the $\overline{P}_{G,HBS-MT}$ subtraction is made by home base station HBSi and the base station BS only sends the mean level of interference on signals transferred by home base station HBSi to the mobile terminal ($\sigma Q_N P_{out} + f\ \overline{P}_{U,BS-MT}, \overline{P}_{I,BS-MT}$; RT.

It has to be noted here that in another variant, the path gain from the home base station HBSi to mobile terminals in zone HIRZi can also be estimated by the base station BS based on mobile terminals path gain measurements and not just from a propagation model. In this case, the $\overline{P}_{G,HBS-MT}$ subtraction is made by the base station BS.

It has to be noted here that in another variant, the empirical interference level may be considered and not only mean and variance. In this case we have a Gaussian mixture due to random nature of the path gain from home base station HBSi to mobile terminal MT in zone HIRZi with same number of Gaussian variables as the number of measurements. According to that variant, the third approach needs to be performed.

At step S500 of the algorithm of FIG. 5, the mobile terminals MT located in the cell CE or, when their location is known, located in each zone HIRZ1 to HIRZ4 performs measurements of the power $P_{I,BS-MT}$.

At next step S501, the measurements are accumulated, for example by the base station BS.

At next step S502, the power $P_{t,HBS}$ is computed based on models and/or measurements already disclosed. For example, the power is computed by the base station BS.

At next step S503, each home base station HBS is notified of the computed power $P_{t,HBs}$ from the base station BS or via the server Serv.

At next step S504, the power is corrected by each home base station HBS by subtracting to the power $P_{t,HBS}$, the mean path gain $\overline{P}_{G,HBS-MT}$ between the base station HBSi and mobile terminal located in zone HIRZi.

It has to be noted here that, the step S504 is executed only in the first variant of the third approach, not in the second variant of the third approach.

At next step S505, the corrected power is applied by each home base station HBSi for transferring radio signals.

FIG. 6 discloses a second example of inter cell interference coordination algorithm according to the present invention.

In the example of FIG. 6, a local inter cell interference coordination with equalisation is performed without control of base station BS degradation and without any information on the home base station HBSi to mobile terminal path gain model.

In the example of FIG. 6 only one value for each of the two variables, $P_{U,BS-MT}$ and $P_{I,BS-MT}$, is available.

According to a variant of the first approach, we have the formula, $$P_{t,HBS} = C + f P_{U,BS-MT}, P_{I,BS-MT}; RT$$

where C is an arbitrary constant which defines the base station BS level of degradation in the cell CE.

If the Shannon capacity ratio as base station BS degradation criterion is considered, we have:

$g\, P_{U,BS-MT}, P_{I,BS-MT},$ $$P_{t,HBS} + P_{G,HBS-MT} = \frac{\log\left(1 + \frac{10^{0.1 P_{U,BS-MT}}}{10^{0.1 P_{I,BS-MT}} + 10^{0.1 P_{t,HBS} + P_{G,HBS-MT}}}\right)}{\log(1 + 10^{0.1 P_{U,BS-MT} - P_{I,BS-MT}})}$$

with $g\, P_{U,BS-MT}, P_{I,BS-MT}, y=RT$ and $y=P_{t,HBS}+P_{G,HBS-MT}$, we deduce $y=f\, P_{U,BS-MT}, P_{I,BS-MT}; RT$ with $f\, P_{U,BS-MT}, P_{I,BS-MT};$ $$RT = 10\log\left(\frac{10^{0.1 P_{U,BS-MT}}}{(1 + 10^{0.1 P_{U,BS-MT} - P_{I,BS-MT}})^{\times RT} - 1} - 10^{0.1 P_{I,BS-MT}}\right)$$

The power $P_{U,BS-MT}$ and $P_{I,BS-MT}$ are supposed to be constant over the zone $Zone_{MT}$ which is here equal to HIRZi and between two inter cell interference coordination updates. These two values are measured by the home base stations HBSi using a downlink receiver capability.

For an outage probability $P_{out}=0.1$ and a threshold RT=0.5, which means that in 10% of cases in the circular zone HIRZi around base station HBSi, the Shannon capacity of a mobile terminal MT is divided by more than two and, we have, $$P_{t,HBS} = C + 10\log\left(\frac{10^{0.1 P_{U,BS-MT}}}{\sqrt{1 + 10^{0.1 P_{U,BS-MT} - P_{I,BS-MT}}} - 1} - 10^{0.1 P_{I,BS-MT}}\right)$$

At step S600 of the algorithm of FIG. 6, each home base station HBS performs measurements of the power $P_{U,BS-MT}$ and $P_{I,BS-MT}$.

At next step S601, the power $P_{t,HBS}$ is computed based on the powers $P_{U,BS-MT}$ and $P_{I,BS-MT}$. For example, the powers are computed by each home base station HBS.

FIG. 7 discloses a third example of inter cell interference coordination algorithm according to the present invention.

In the example of FIG. 7, a local inter cell interference coordination is performed with control of base station BS degradation with both measurements and model based values. A Gaussian model is considered for the random part and measured data are used for evaluating the mean and variance of the Gaussian variables $P_{U,BS-MT}$ and $P_{I,BS-MT}$ which corresponds to the second variant of the second approach. Then:

$$P_{t,HBS} = -\overline{P}_{G,HBS-MT} + \sigma Q_N P_{out} + f \overline{P}_{U,BS-MT}, \overline{P}_{I,BS-MT}; RT$$

In addition, if the Shannon capacity ratio for the base station BS degradation criteria is considered, $g\, P_{U,BS-MT}, P_{I,BS-MT},$ $$P_{t,HBS} + P_{G,HBS-MT} = \frac{\log\left(1 + \frac{10^{0.1 P_{U,BS-MT}}}{10^{0.1 P_{I,BS-MT}} + 10^{0.1 P_{t,HBS} + P_{G,HBS-MT}}}\right)}{\log(1 + 10^{0.1 P_{U,BS-MT} - P_{I,BS-MT}})}$$

with $g\, P_{U,BS-MT}, P_{I,BS-MT}, y=RT$ and $y=P_{t,HBS}+P_{G,HBS-MT}$, we deduce $y=f\, P_{U,BS-MT}, P_{I,BS-MT}; RT$, with $f\, P_{U,BS-MT}, P_{I,BS-MT};$ $$RT = 10\log\left(\frac{10^{0.1 P_{U,BS-MT}}}{(1 + 10^{0.1 P_{U,BS-MT} - P_{I,BS-MT}})^{RT} - 1} - 10^{0.1 P_{I,BS-MT}}\right)$$

As the measurements of base station signal power are made at the home base station HBSi which is in a building, we must remove the building penetration loss, $G_{pw}^{HBS}$ from the measurements.

As the measurements are made by home base stations HBS, the antenna needs to be compensated by removing $\Delta_{ant}^{HBS-MT} = G_{ant,HBS} - G_{ant,MT}$.

The received power of the signal transferred by the base station BS is considered to be constant in the zone HIRZi, i.e. the power values $P_{U,BS-MT}$ and $P_{I,BS-MT}$ are constant. These two values are measured by the home base station HBSi.

As the base station BS degradation is intended to be controlled, quantitative information on path gain between home base station HBSi and mobile terminals MT located in zone HIRZi needs to be obtained.

For that, a classic propagation model with shadowing and a circular zone HIRZi centered on home base station HBSi of radius $r_{DZ,HBSi}$ are considered. The home base station HBS to mobile terminal path gain follows a Gaussian distribution N $\overline{P}_{G,HBS-MT}, \sigma_{P_{G,HBS-MT}}^2$ with, $$\overline{P}_{G,HBS-MT} = G_0^{HBS} + G_{pw}^{HBS} + G_{ant,HBS} + G_{ant,MT} - 10\alpha^{HBS-out}$$
$$\log r_{DZ,MT} \sigma_{P_G,F-MT} = \sigma_{HBS,Sh}$$

With this model and measurements $\hat{P}_{U,BS-MT}$ and $\hat{P}_{I,BS-MT}$ of $P_{U,BS-MT}$ and $P_{I,BS-MT}$, we compute in the home base station HBS, $$P_{t,HBS} = \underbrace{-G_0^{HBS} - 2G_{ant,MT} + 10\alpha^{HBS-out}\log r_{DZ,MT} + \sigma_{HBS,Sh}Q_N P_{out}}_{\text{Control of macro degradation (constant for all femto)}} +$$

$$\underbrace{10\log\left(\frac{10^{0.1\hat{P}_{U,BS-MT}}}{\left(1+10^{0.1\hat{P}_{U,BS-MT}-\hat{P}_{I,BS-MT}}\right)^{RT}-1} - 10^{0.1\hat{P}_{I,BS-MT}}\right)}_{\text{Equalization}}$$

For example, $r_{DZ,MT} = 6$, $G_{pw}^{HeNB} = 20$ dB, $$G_0^{HBS} + G_{pw}^{HBS} + G_{ant,HBS} + G_{ant,MT} =$$
$$-\underbrace{30.5}_{\text{Reference path loss}} - \underbrace{20}_{\text{Wall penetration loss}} + \underbrace{5+0}_{\text{Antenna gain}} = -45.5 \text{ dB}$$

$\alpha^{HBS-out} = 3.67$ and $\sigma_{HBS,Sh} = 10$ dB.

For an outage probability $P_{out}=0.1$ and a threshold RT=0.5, in 10% of cases in the circular zone HIRZi around home base station HBSi, the capacity of the base station BS is divided by more than 2. The power is equal to:

$$P_{t,HBS} = -45.5 - 28 - 10 \times 1.2816 - 5 + 20 +$$
$$10\log\left(\frac{10^{0.1\hat{P}_{U,BS-MT}}}{\sqrt{1+10^{0.1\hat{P}_{U,BS-MT}-\hat{P}_{I,BS-MT}}}-1} - 10^{0.1\hat{P}_{I,BS-MT}}\right) =$$
$$55.74 + 10\log\left(\frac{10^{0.1\hat{P}_{U,BS-MT}}}{\sqrt{1+10^{0.1\hat{P}_{U,BS-MT}-\hat{P}_{I,BS-MT}}}-1} - 10^{0.1\hat{P}_{I,BS-MT}}\right)$$

In a variant of the third example, the receive powers of the neighbouring base station, including the serving base station BS, are variable and random inside the zone HIRZi. In this case, $\sigma_{HBS,SH}$ is replaced by $\sqrt{\sigma_{HBS,Sh}^2+\sigma_f^2}$ and $\sigma_f$ corresponds especially to standard deviation of base station interference power in the zone HIRZi. The variables $\hat{P}_{U,BS-MT}$ and $\hat{P}_{I,BS-MT}$ are replaced by their average.

At step S700, the home base stations HBS compute $-\overline{P}_{G,HBS-MT}+\sigma Q_N P_{out}$.

At next step S701, the home base stations obtain data used for evaluating the mean and variance of the Gaussian variables $P_{U,BS-MT}$ and $P_{I,BS-MT}$.

It has to be noted here that, the step S701 is executed only in the first variant of the third approach, not in the second variant of the third approach.

At next step S702, the power $P_{t,HBS}$ is computed based the power $P_{U,BS-MT}$ and $P_{I,BS-MT}$. For example, the power is computed by each home base station HBS.

FIG. 8 discloses a fourth example of inter cell interference coordination algorithm according to the present invention.

In the example of FIG. 8, a local inter cell interference coordination is performed with control of base station BS degradation. with only power data values for example based on measurements made by mobile terminals MT during handover between base station and home base station.

The transmit power of one particular HBS is, $$P_{t,HBS} = -\overline{P}_{G,HBS-MT} + Q_{Data,\overline{P}_{G,HBS-MT}-P_{G,HBS-MT,j}+f_j} P_{out}$$

where the mean path gain between home base station HBSi and mobile terminal in zone HIRZi is $$\hat{\overline{P}}_{G,HBS-MT} = \frac{1}{N_{Measures}} \sum_{j=1}^{N_{Measures}} P_{G,HBS-MT,j}.$$

If the Shannon capacity ratio is considered as base station BS degradation criterion, $g P_{U,BS-MT}, P_{I,BS-MT}$, $$P_{t,HBS} + P_{G,HBS-MT} = \frac{\log\left(1 + \frac{10^{0.1P_{U,BS-MT}}}{10^{0.1P_{I,BS-MT}} + 10^{0.1P_{t,HBS}+P_{G,HBS-MT}}}\right)}{\log(1+10^{0.1P_{U,BS-MT}-P_{I,BS-MT}})}$$

With g $P_{U,BS-MT}$, $P_{I,BS-MT}$, y=RT and y=$P_{t,HBS}$+$P_{G,HBS-MT}$, we deduce y=f $P_{U,BS-MT}$, $P_{I,BS-MT}$; RT, with $f\ P_{U,BS-MT}, P_{I,BS-MT}$;

$$RT = 10\log\left(\frac{10^{0.1P_{U,BS-MT}}}{(1+10^{0.1P_{U,BS-MT}-P_{I,BS-MT}})^{RT}-1} - 10^{0.1P_{I,BS-MT}}\right).$$

$P_{U,BS-MT,j}, P_{I,BS-MT,j}, P_{G,HBS-MT,j}{}_{j=1\ldots N_{Meas}}$ are supposed to be either measured by mobile terminals performing handover from base station BS to home base station HBS and transmitted after the handover has been completed or be measured by mobile terminals performing handover from home base station HBS to base station BS.

When the home base station HBS has a sufficient number of measurements, it computes $$f\ P_{U,BS-MT,j}, P_{I,BS-MT,j}; RT_{j=1\ldots N_{Meas}} \equiv f_j{}_{j=1\ldots N_{Meas}}$$

and its transmit power with a technique of evaluation of quantile on empirical data as already disclosed.

At step S800 of the algorithm of FIG. 8, measurements are performed by mobile terminals, for example during handover between base station and home base station.

At next step S801, measurements are accumulated and centralised at home base stations.

At next step S802, each home base station HBSi computes $$\hat{\overline{P}}_{G,HBS-MT} = \frac{1}{N_{Measures}} \sum_{j=1}^{N_{Measures}} P_{G,HBS-MT,j}$$

and $P_{U,BS-MT,j}, P_{I,BS-MT,j}, P_{G,HBS-MT,j}{}_{j=1\ldots N_{Meas}}.$

At next step S803, each home base station HBSi evaluates the quantile on empirical data as already disclosed.

At next step S804, each home base station HBSi computes the power $P_{t,HBS}$.

FIG. 9 discloses a fifth example of inter cell interference coordination algorithm according to the present invention.

In the example of FIG. 9, a local inter cell interference coordination is performed with control of base station BS degradation, with position based measurement values and a propagation model.

The transmit power of one home base station HBSi is $$P_{t,HBS} = -\overline{P}_{G,HBS-MT} + \sigma Q_N P_{out} + f\overline{P}_{U,BS-MT}, \overline{P}_{I,BS-MT}; RT$$

If the Shannon capacity ratio is considered as base station BS degradation criterion, $g P_{U,BS-MT}, P_{I,BS-MT},$ $$P_{t,HBS} + P_{G,HBS-MT} = \frac{\log\left(1 + \frac{10^{0.1 P_{U,BS-MT}}}{10^{0.1 P_{I,BS-MT}} + 10^{0.1 P_{t,HBS} + P_{G,HBS-MT}}}\right)}{\log(1 + 10^{0.1 P_{U,BS-MT} - P_{I,BS-MT}})}$$

with $g\ P_{U,BS-MT}, P_{I,BS-MT}, y = RT$ and $y = P_{t,HBS} + P_{G,HBS-MT}$, we deduce $y = f\ P_{U,BS-MT}, P_{I,BS-MT}; RT$, with $f\ P_{U,BS-MT}, P_{I,BS-MT};$ $$RT = 10\log\left(\frac{10^{0.1 P_{U,BS-MT}}}{(1 + 10^{0.1 P_{U,BS-MT} - P_{I,BS-MT}})^{RT} - 1} - 10^{0.1 P_{I,BS-MT}}\right)$$

As no measurements are available, the quantitative information of the path gain between the home base station HBSi and mobile terminal, the path gain between the base station BS and mobile terminal and the interference level in the zone of interest HIRZi need to be obtained. For this purpose, a classic propagation model with shadowing and a circular zone HIRZi centered on the home base station HBSi of radius $r_{DZ,HBSi}$ are considered. The path gains between the home base station HBSi and mobile terminals, follow a Gaussian distribution $N\ \overline{P}_{G,HBS-MT}, \sigma_{P_{G,HBS-MT}}^2$ with, $$\overline{P}_{G,F-MT} = G_0^{HBS} + G_{pw}^{HBS} + G_{ant,HBS} + G_{ant,ME} - 10\alpha^{HBS-out}$$
$$\log r_{DZ,MT} \sigma_{P_{G,HBS-MT}} = \sigma_{HBS,Sh}.$$

The paths gain between the base station BSj where j denotes an indicia which may distinguish the base station BSj among plural neighbouring base stations and mobile terminals MT follow a Gaussian distribution $N\ \overline{P}_{G,BS-MT,j}, \sigma_{P_{G,BS-MT}}^2$ with for each base station:

$$\overline{P_{G,BS-MT,j}} = G_{ant,BS,j} \vec{X} - \vec{X}_{BS,j} + G_{ant,MT} + G_{0,BS} - 10\alpha^{BS}$$
$$\log\|\vec{X} - \vec{X}_{BS,j}\|_2 \sigma_{P_{G,BS-MT}} = \sigma_{BS,Sh}$$

where $\vec{X}$ and $\vec{X}_{BS,i}$ are respectively the mobile terminal and base station BS positions. It has to be noted here that the antenna gain $G_{ant,BS,j}$ for base station BS j may not be omnidirectional.

Let allocate the null indicia to the base station BS which serves the mobile terminal MT.

We have for the base station BS0 useful power, $$\overline{P}_{U,BS-MT} = P_{t,BS,0} + \overline{P}_{G,BS-MT,0} = P_{t,BS,0} + G_{ant,BS,0}\vec{X} - \vec{X}_{BS,0} + G_{ant,MT} + G_{0,BS} - 10\alpha^{BS}\log\|\vec{X} - \vec{X}_{BS,0}\|_2$$

where $P_{t,BS,j}$ is the transmit radio signal power of base station BSj and for interference power from neighbouring base stations BSj with j different from 0 plus Additive White Gaussian Noise:

where $N_{awgn}$ is the Additive White Gaussian Noise level at mobile terminal MT.

$\sigma_{P_{I,BS-MT}} \leq \sigma_{BS,Sh}$ and can set equal to $\sigma_{BS,Sh}$.

The position of the mobile terminal MT with respect to each base station BS sector needs to be known in order to take into account the antenna selectivity. This can be made by reading on the core network the position of base station BS site, sector orientation and measuring the position of the home base station HBS in order to compute the distance and orientation relative to each base station. A simplification with an ideal rectangular angular antenna diagram of 120° width for tri-sector sites is possible. The base station BS transmit power may also be obtained from the core-network or through the system information sent by the base station BS through the wireless channel.

The home base station HBS transmit power is computed with:

$$P_{t,HBS} = \underbrace{-G_{0,HBS} + 10\alpha^{HBS-out}\log r_{DZ,MT} + Q_N P_{OUT}\sqrt{\sigma_{HBS,Sh} + \sigma_{BS,Sh}}}_{\text{Control of macro degradation (constant for all femto)}} +$$

$$10\log\left(\frac{10^{0.1 P_{U,BS-MT}}}{(1 + 10^{0.1 P_{U,BS-MT} - P_{I,BS-MT}})^{RT} - 1} - 10^{0.1 P_{I,BS-MT}}\right)$$

At step S900, each home base station HBS computes $-\overline{P}_{G,HBS-MT} + \sigma Q_N P_{out}$.

At next step S901, the home base stations HBS obtain position based measurement values.

At next step S902, the home base stations compute the serving base station useful power and interference power from neighbouring base stations other than the serving base station BS.

At next step S903, each home base station HBSi computes the power $P_{t,HBS}$.

According to a variant of the fifth example of realisation, distance instead of position may be used.

According to another variant of the fifth example of realisation, Gaussian interference model proposed in the core-network may also be directly exploited.

According to another variant of the fifth example of realisation, the base station BS model parameters can be estimated/refined by base station BS with the couple path gain—relative position measurements. These model parameters may be stored on the core-network and subsequently loaded by home base stations BS.

It has to be noted here that the present invention is applicable on all the frequency resources of the wireless telecommunication network or on at least part of the frequency resources of the wireless telecommunication network.

The present invention has also been disclosed in an example wherein the same threshold RT and outage probability $P_{out}$ are defined for all home base stations. The present invention is also applicable when a threshold RT and outage probability $P_{out}$ are defined for each home base station (for example $P_{out}$ could be inversely proportional to the density of mobile terminals MT in the considered HIRZ).

$$\overline{P}_{I,BS-MT} = 10\log\left(10^{0.1\left(G_{0,BS} + G_{ant,MT} + 10\log\left(\sum_{j/j\neq 0} 10^{0.1 \times P_{t,BS,j} + G_{ant,BS,j}\vec{X} - \vec{X}_{BS,j} - 10\alpha^{BS}\log\|\vec{X} - \vec{X}_{BS,j}\|_2}\right)\right)} + N_{awgn}\right)$$

Naturally, many modifications can be made to the embodiments of the invention described above without departing from the scope of the present invention.

The invention claimed is:

1. Method for adjusting transmission power of signals transferred by at least one home base station through a wireless interface to at least one mobile terminal, the at least one home base station being located in a cell of a base station, wherein the method comprises:
determining at least one high interference reference zone around the at least one home base station, the high interference reference zone being a zone in which signals transferred by the base station and the at least one home base station interfere, and
controlling adjustment of signal transmission power for the at least one home base station in order to ensure a given outage probability that a given function g representing the mobile terminal performance degradation level is lower than or equal to a threshold value in the high interference reference zone around the at least one home base station.

2. Method according to claim 1, wherein the function g representing the mobile terminal performance degradation level is defined according to a ratio of the base station interference level from neighbouring base stations and the received power from the at least one home base station or a ratio of base station signal to interference plus noise ratio with the interference from the at least one home base station and base station signal to interference plus noise ratio without the interference from the at least one home base station or a ratio of Shannon capacity from base station with the interference from the at least one home base station and Shannon capacity from base station without the interference from the at least one home base station or a ratio of modelled spectral efficiency from base station with the interference from the at least one home base station and modelled spectral efficiency from base station without the interference from the at least one home base station or a ratio of empirical spectral efficiency from base station with the interference from the at least one home base station and empirical spectral efficiency from base station without the interference from the at least one home base station.

3. Method according to claim 1 or 2, wherein plural home base stations are included in the cell of the base station and in that the same signal transmission power is used by each home base station included in the cell of the base station.

4. Method according to claim 1 or 2, wherein plural home base stations are included in the cell of the base station and the home base stations include at least one subset of home base stations using the same signal transmission power and there is at least one home base station which does not belong to the one subset of home base stations using a signal transmission power that is different from the signal transmission power used by the home base stations included in said one subset of home base stations.

5. Method according to claim 1 or 2, wherein plural home base stations are included in the cell of the base station and in that the signal transmission power used by each home base station is peculiar to each home base station included in the cell of the base station.

6. Method according to claim 5, wherein plural home base stations are included in the cell of the base station and in that the signal transmission power used by each home base station included in the cell of the base station is decomposed into a common value for the home base stations included in the cell of the base station and an adjustment value peculiar to each home base station included in the cell of the base station.

7. Method according to claim 5 wherein the signal transmission power is further adjusted for the same high interference reference zone, the same outage probability, the same threshold value and the same function g for each home base station included in the cell of the base station.

8. Method according to claim 1, wherein the function g depends on useful power received by a mobile terminal located in the high interference reference zone from the base station and/or depends on interfering power received by the mobile terminal from at least one neighbouring base station plus Additive White Gaussian Noise and/or depends on power which is received by the mobile terminal from the home base station or on one path gain or on a combination of path gains between the at least one home base station and the mobile terminal and the signal power which is radiated by said at least one home base station.

9. Method according to claim 8, wherein the useful power received by at least one mobile terminal from the base station, and/or the interfering power from at least one neighbouring base station plus Additive White Gaussian Noise and/or the power received by the mobile terminal from the at least one home base station or one path gain or the combination of the path gains between the at least one home base station and the mobile terminal are obtained by measurements.

10. Method according to claim 8, wherein the useful power received by the mobile terminal from the base station, and/or the interfering power from at least one neighbouring base station plus Additive White Gaussian Noise and/or the power received by the mobile terminal from the at least one home base station or one path gain or the combination of the path gains between the at least one home base station and the mobile terminal are obtained from a given model.

11. Method according to claim 8, wherein the useful power received by the mobile terminal from the base station, and/or the interfering power from at least one neighbouring base station plus Additive White Gaussian Noise and/or the power received by the mobile terminal from the home base station or one path gain or the combination of the path gains between the at least one home base station and the mobile terminal are obtained from samples generated from a method based on a given model.

12. Method according to claim 1 wherein the signal transmission power for the at least one home base station is adjusted according to information representative of the location of at least one mobile terminal.

13. Method according to claim 1 wherein the signal transmission power for the at least one home base station is adjusted on the basis of a quantile at a given probability value of a function u of random variables, the quantile being the value of u such that the probability that u is lower than UQ is equal to the given probability value.

14. Method according to claim 13, wherein the quantile is obtained using a random model, numerical values, or a combination of both.

15. Device for adjusting the transmission power of signals transferred by at least one home base station through a wireless interface to at least one mobile terminal, the at least one home base station being located in a cell of a base station, wherein the device comprises:
means for determining at least one high interference reference zone around the at least one home base station, the high interference reference zone being a zone in which signals transferred by the base station and the at least one home base station interfere, and
means for controlling adjustment of signal transmission power for the at least one home base station in order to ensure a given outage probability that a given function g representing the mobile terminal performance degradation level is lower than or equal to a threshold value in the high interference reference zone around the at least one home base station.

* * * * *